US010261889B2

(12) United States Patent
Asthana et al.

(10) Patent No.: US 10,261,889 B2
(45) Date of Patent: Apr. 16, 2019

(54) TECHNIQUES FOR EDIT-AND-CONTINUE AND ENHANCED OPTIMIZED DEBUGGING ON OPTIMIZED CODE

(71) Applicant: Microsoft Corporation, Redmond, WA (US)

(72) Inventors: Ankit Asthana, Redmond, WA (US); Ayman Baligh Shoukry, Smamamish, WA (US); Ten H. Tzen, Sammamish, WA (US); Changqing (Charles) Fu, Sammamish, WA (US); Patrick W. Sathyanathan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 14/315,111

(22) Filed: Jun. 25, 2014

(65) Prior Publication Data

US 2015/0378871 A1    Dec. 31, 2015

(51) Int. Cl.
| | | |
|---|---|---|
| *G06F 9/44* | (2018.01) | |
| *G06F 11/36* | (2006.01) | |
| *G06F 8/41* | (2018.01) | |
| *G06F 8/71* | (2018.01) | |
| *G06F 8/73* | (2018.01) | |

(52) U.S. Cl.
CPC .......... *G06F 11/3664* (2013.01); *G06F 8/443* (2013.01); *G06F 8/71* (2013.01); *G06F 8/73* (2013.01); *G06F 11/3628* (2013.01)

(58) Field of Classification Search
CPC ........... G06F 8/40–8/54; G06F 11/36–11/3696
USPC .................................................. 717/124–161
See application file for complete search history.

(56) References Cited

U.S. PATENT DOCUMENTS

| | | | | |
|---|---|---|---|---|
| 5,675,803 A | * | 10/1997 | Preisler | G06F 11/3624 714/E11.21 |
| 5,758,160 A | | 5/1998 | McInerney et al. | |
| 5,978,585 A | * | 11/1999 | Crelier | 717/145 |
| 6,091,896 A | | 7/2000 | Curreri et al. | |
| 6,182,281 B1 | | 1/2001 | Nackman et al. | |
| 6,530,075 B1 | * | 3/2003 | Beadle et al. | 717/114 |
| 6,795,963 B1 | | 9/2004 | Andersen et al. | |

(Continued)

FOREIGN PATENT DOCUMENTS

CN    102236550 A    11/2011

OTHER PUBLICATIONS

Pollock et al. "Incremental Compilation of Locally Optimized Code", 1984, Proceedings of the 12th ACM SIGACT-SIGPLAN symposium on Principles of programming languages.*

(Continued)

*Primary Examiner* — Jue Louie
(74) *Attorney, Agent, or Firm* — Fiala & Weaver P.L.L.C.

(57) ABSTRACT

Methods, systems, and computer program products are provided that enable a portion of code to be marked in source code to disable compilation optimizations for the marked portion of code, while the rest of the source code is compiled with optimizations. In this manner, edit-and-continue debugging may be performed on the compiled source code in an enhanced manner. Modifications made to the marked source code (as well as the rest of the source code) may be compiled in an incremental manner, such that the portions of the source code affected by the modifications are compiled, while unaffected portions of the source code are not recompiled.

20 Claims, 11 Drawing Sheets

(56) References Cited

U.S. PATENT DOCUMENTS

| | | | |
|---|---|---|---|
| 7,516,441 B2 | 4/2009 | Hamilton et al. | |
| 7,565,644 B2 | 7/2009 | Johnson et al. | |
| 8,117,587 B1 | 2/2012 | Testardi | |
| 8,271,958 B2 | 9/2012 | Stall et al. | |
| 8,276,123 B1* | 9/2012 | Deng | G06F 11/3688 714/37 |
| 8,631,219 B2 | 1/2014 | Thomas et al. | |
| 2005/0010912 A1* | 1/2005 | Adolphson et al. | 717/151 |
| 2005/0034109 A1* | 2/2005 | Hamilton | G06F 11/3664 717/140 |
| 2009/0313600 A1 | 12/2009 | Ayers et al. | |
| 2011/0271259 A1 | 11/2011 | Moench et al. | |
| 2013/0275947 A1* | 10/2013 | Bates | G06F 8/41 717/124 |

OTHER PUBLICATIONS

Hölzle et al. "Debugging Optimized Code with Dynamic Deoptimization", 1992, Proceedings of the ACM SIGPLAN 1992 conference on Programming language design and implementation.*

Chambers et al. "A Framework for Selective Recompilation in the Presence of Complex Intermodule Dependencies", 1995, Proceedings of the 17th international conference on Software engineering.*

MSDN, "Optimize Visual Studio 2012", Nov. 13, 2012, retrieved from: http://web.archive.org/web/20121113202954/http://msdn.microsoft.com/en-us/library/chh3fb0k.aspx.*

Ramdon ASCII, "Debugging Optimized Code—New in Visual Studio 2012", Sep. 11, 2013, retrieved from: https://randomascii.wordpress.com/2013/09/11/debugging-optimized-codenew-in-visual-studio-2012/.*

Andrew Hall, "C++ Edit and Continue in Visual Studio 2015", 2015, Visual C++ Team Blog, retrieved from: https://blogs.msdn.microsoft.com/vcblog/2015/07/22/c-edit-and-continue-in-visual-studio-2015/.*

Chen et al. "Case Study of Feature Location Using Dependence Graph", 2000, Proceedings IWPC 2000. 8th International Workshop on Program Comprehension.*

Chen et al. "RIPPLES: Tool for Change in Legacy Software", 2001, Proceedings IEEE International Conference on Software Maintenance. ICSM 2001.*

Pollock, et al., "Incremental Global Optimization for Faster Recompilations", In Proceedings of International Conference on Computer Languages, Mar. 12, 1990, pp. 281-290.

Staheli, David G., "Enhanced Debugging with Edit and Continue in Microsoft Visual C++ 6.0", Published on: Aug. 1998, Available at: http://msdn.microsoft.com/en-us/library/aa260823(v=vs.60).aspx, 18 pages.

Bhakta, Rajan, "Debugging Optimized Code", Published on: Oct. 15, 2013, Available at: http://www.ibm.com/developerworks/rational/library/debugging-optimized-code/, 5 pages.

"Recode Deoptimize," copyright 2014, Indefiant Ltd., downloaded from http://www.indefiant.com/recode/help/deoptimize.html on Jun. 25, 2014, 2 pages.

"Function Specific Option Pragmas—Using the GNU Compiler Collection (GCC)", Retrieved on: Aug. 27, 2015, Available at: https://gcc.gnu.org/onlinedocs/gcc/Function-Specific-Option-Pragmas.html, 1 page.

Holzle, et al., "Debugging Optimized Code with Dynamic Deoptimization", In Proceedings of the ACM SIGPLAN 1992 Conference on Programming Language Design and Implementation, vol. 27, Issue 7, Jul. 1, 1992, pp. 32-43.

International Search Report & Written Opinion Issued in PCT Application No. PCT/US2015/037047, dated Sep. 7, 2015, 11 Pages.

"Second Written Opinion Issued in PCT Application No. PCT/US2015/037047", dated Jun. 13, 2016, 5 Pages.

"International Preliminary Report on Patentability Issued in PCT Application No. PCT/US2015/037047", dated Sep. 27, 2016, 7 Pages.

"First Office Action and Search Report Issued in Chinese Patent Application No. 201580034673.1", dated Aug. 20, 2018, 17 Pages.

"C language advancement: analysis of key points, difficulties and doubts", In the Book of Advanced C Programming language Focal Parts and Difficult Points, 7 Pages.

"Understanding the JVM Advanced features and Best Practices", In the Book of Understanding the JVM Advanced features and Best Practices, Second Edition, 6 Pages.

* cited by examiner

502

Generate an incremental program database that at least indicates dependencies between functions of the fully optimized compiled representation of the source code

Generate a dependence graph for the source code based on the incremental program database

604

Traverse the dependence graph from any functions and any variables included in the marked portion (or determined as changed) to determine a set of affected functions

606

Include any functions in the marked portion (or determined as changed) and any functions in the determined set of affected functions in a set of functions to be recompiled with optimizations disabled

FIG. 6

TECHNIQUES FOR EDIT-AND-CONTINUE AND ENHANCED OPTIMIZED DEBUGGING ON OPTIMIZED CODE

BACKGROUND

Various types of development applications exist that software developers may use to develop software. An integrated development environment (IDE) is a type of software development application that contains several development tools in one package. An IDE may include tools such as a source code editor, a build automation tool, and a debugger. Examples of IDEs include Eclipse™ developed by Eclipse Foundation of Ottawa, Canada, ActiveState Komodo™ developed by ActiveState of Vancouver, Canada, IntelliJ IDEA developed by JetBrains of the Czech Republic, Oracle JDeveloper™ developed by Oracle Corporation of Redwood City, Calif., NetBeans developed by Oracle Corporation, Codenvy™ developed by Codenvy of San Francisco, Calif., Xcode® developed by Apple Corporation of Cupertino, Calif., and Microsoft® Visual Studio®, developed by Microsoft Corporation of Redmond, Wash.

Edit-and-Continue is a time saving feature built into some IDE tools, such as Microsoft® Visual Studio® Debugger. Edit-and-Continue allows a user to make source code edits while in a live debugging context. Edit-and-Continue is very useful in the development of many types of applications, including the development of video games, where developers may generate optimized builds in daily use (primarily for performance reasons).

It is extremely difficult to enable Edit-and-Continue for native code (e.g., C/C++) and IDE's tend to stay away from Edit-and-Continue for native code today because the user experience is very poor. An optimized build results in machine code that is semantically equivalent to machine code generated without optimizations, but is configured in a way that fewer resources are used during execution of the optimized machine code (e.g., less memory, fewer procedure calls, etc.). Enabling edit-and-continue is extremely challenging for optimized code. For native optimized code, it is extremely difficult to co-relate the instructions generated in the optimized machine code binary with the instructions in the application source code. This is primarily due to the many types of optimizations that may be performed (e.g., inlining, register allocation, Common Subexpression elimination etc.).

Many developers also use optimized build configurations for their daily developer build scenarios. This is a very common practice for game developers, who need the game to run at a particular speed to add visual effects, etc. Due to some of the optimizations mentioned above, it is common for a developer that is debugging optimized code to observe a hopping program counter (the program counter jumps around in a manner that is not sequential), cross-jumping, and the well-known roving variable phenomenon (e.g., a variable might be dead and its register is reused, assignment to a variable has been moved etc.), which make debugging the optimized code difficult to understand for the average developer. This also leads to Edit-and-Continue not being operational for optimized code.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that enable a portion of code to be marked in source code so that compilation optimizations are disabled for the marked portion of code, while the rest of the source code is compiled with optimizations. In this manner, edit-and-continue debugging may be performed on the compiled source code in an enhanced manner. Furthermore, modifications made to the marked portion of the source code (as well as the rest of the source code) may be compiled in an incremental manner, such that the portions of the source code affected by the modifications are compiled, while unaffected portions of the source code are not recompiled.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant arts) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 5 shows a process for generating an incremental program database that stores information about source code, according to an example embodiment.

FIG. 6 shows a flowchart providing a process for determining functions to be compiled with optimizations disabled using a dependence graph, according to an example embodiment.

Figure 1:
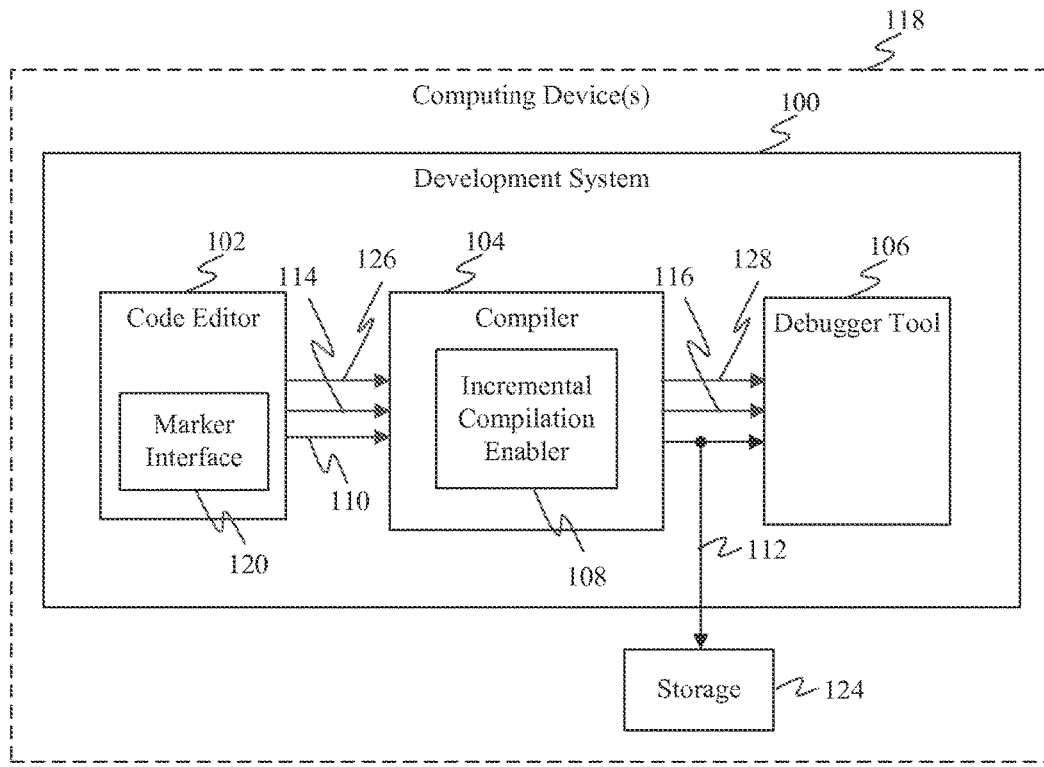
FIG. 1 shows a block diagram of a computing device that includes a code editor that enables source code to be marked to avoid compilation optimizations, and a compiler configured to perform incremental compilation of source code, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Incremental Compilation

Embodiments described herein enable a portion of source code (e.g., one or more functions) to be marked by a developer to cause optimizations for the marked portion to be disabled when compiled. The rest of the source code may be compiled with optimizations enabled. In this manner, the developer is enabled to perform "edit and continue" (EnC) on the partially optimized code, where the developer will be better enabled to co-relate the instructions in the marked portion of the source code with the optimized code. The developer can mark the portions of the source code that the developer wants to focus their debugging efforts on at that particular time.

EnC is used in the development of all types of applications, including gaming applications. In the gaming industry, the use of optimized build configurations is common. No other IDE's today provide a way to perform EnC successfully on optimized code at the function-by-function level.

Thus, embodiments enable developers to be better able to debug optimized compiled code using EnC. Because a compiler generates debugging tables for a compilation unit before it performs optimizations, the optimizing transformations may invalidate some of the debugging data, making conventional forms of debugging difficult. For instance, if during an optimization, a loop is strength-reduced, in the resulting optimized machine code, the loop control variable may be completely eliminated and thus cannot be displayed in the debugger tool. The "hopping Program Counter" problem (repeated step or next commands show the program counter bouncing back and forth in the code) may occur due to various optimizations, such as common subexpression elimination (using a single instance of code for a quantity that the source computes several times), invariant code motion (moving an expression that does not change within a loop, to the beginning of the loop), instruction scheduling, etc. "Cross-jumping" problem is where two identical pieces of code are merged, and the program counter suddenly jumps to a statement that is not supposed to be executed, simply because it (and the code following) translates to the same thing as the code that was supposed to be executed. The "roving variable" problem (an unexpected value in a variable) may have various causes, including a dead variable (and its register is reused), the assignment of a value to a variable may have been moved, or a variable may be eliminated entirely by value propagation or other means. Embodiments reduce these difficulties in debugging optimized code by letting the developer select particular code to not be optimized during a debug session.

Furthermore, compilers, including standalone compilers and compilers of integrated development environments (IDE), are enabled to perform incremental compilation of source code. A developer (a person who designs program code) is enabled to make modifications/revisions to source code, including making edits to the marked and/or un-marked portions of the source code, and instead of the source code being recompiled in its entirety, just the portions of the source code that were affected by the modifications/revisions are compiled. As such, incremental compilation reduces build time by having to recompile less code. This is a major improvement over conventional system, as the time spent between "edit-build-debug" cycles is greatly reduced.

Accordingly, in embodiments, an initial full build may be performed, where all functions of the source code are compiled. During the full build, inter-function dependencies and other information required to support incremental compilation is collected and stored in a database, which may be referred to as the Incremental Program Database (IPDB).

While in a live debugging context, an interface is provided in the IDE for a person who is developing/creating the source code, referred to as a "developer" (also referred to as "user" herein), to indicate which code portion or segment (function or series of functions) is to have EnC and/or other improved optimized debugging experience enabled.

The function(s) indicated by the user input are marked as "dirty" and an analysis is performed using a dependency graph (created from the IPDB) to determine which functions of the source code need to be recompiled. The dependency graph includes the following information for performing the analysis:

(a) A node for each function in the source code, where information about the function is stored. The information stored for each function is information which impacts optimization and code generation for the function itself and other functions. For example, a checksum of the expression intermediate language (IL) code may be stored for a function that can be used to detect whether the function has been edited.

(b) A node for each global/module static variable in the source, where attributes of the variable that can affect code generation are stored.

(c) Edges between two function nodes are stored. An edge from a first function to a second function represents that a change in the first function can affect the code generated for the second function. The edges can be configured to represent different kinds of dependences between functions. For instance, one type of edge can be an "inline" edge from node 1 to node 2, if the function of node 1 is inlined into the function of node 2 during optimized compilation.

(d) Edges from global variable nodes to function nodes are stored. An edge from a variable to a function represents that a change in an attribute of the variable affects the machine code generated for the function.

The functions that are marked "dirty", and any functions determined to be affected by the marked functions, are recompiled with optimizations disabled to allow enablement of Edit and Continue and an improved Optimized Debugging experience.

The recompiled functions are patched into the existing optimized machine code. This patch may be performed in memory, such that the existing function implementations are appended with these new function implementations (build for purposes of debugging).

The debugger may then restore application state and resume control initially on the old function definitions. The next time a chosen function is invoked, the debugger now points to the debuggable versions of these function entities, allowing for ENC and an improved experience for optimized debugging.

Assuming that no source code changes are made to the application source code itself, the next time the application is built by the compiler, the application may be built with optimizations enabled for the entire code base.

Numerous exemplary embodiments are described in the following sections for marking code to disable optimizations, and for performing incremental compilation.

A. Example Development System Embodiments for Efficient Code Compilation

Development systems may be configured in various ways to disable optimized compilation for selected source code, and to perform incremental compilation of source code, in embodiments. For instance, FIG. 1 shows a block diagram of a development system 100, according to an example embodiment. As shown in FIG. 1, development system 100 includes a source code editor 102, a compiler 104, and a debugger tool 106. Furthermore, compiler 104 includes an incremental compilation enabler 108. The features of system 100 are described as follows.

As shown in FIG. 1, development system 100 may be implemented in one or more computing devices 118. For instance, source code editor 102, compiler 104, and debugger tool 106 may be included in a same computing device, or one or more of source code editor 102, compiler 104, and debugger tool 106 may be implemented in or more computing devices separate from those of others of source code editor 102, compiler 104, and debugger tool 106.

Computing device(s) 118 may be any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer).

A developer may interact with source code editor 102 to enter and modify program code when generating source code for an application. For instance, the developer may add, modify, or delete program code text using source code editor 102 such as by typing, by voice input, by selecting suggested code blocks, etc. When complete, or at other intervals, the user may be enabled to save the program code by interacting with a "save" button or other user interface element. Source code editor 102 may be a browser based editor, a code editor integrated in a desktop or mobile application, or any other type of code editor.

For instance, as shown in FIG. 1, a developer may interact with source code editor 102 to generate source code 110. Source code 110 is a collection of computer instructions (possibly with comments) written using a human-readable computer programming language. Examples of suitable human-readable computer programming languages include C, C++, Java, etc. Source code 110 may be received in one or more files or other form. For instance, source code 110 may be received as one or more ".c" files (when the C programming language is used), as one or more ".cpp" files (when the C++ programming language is used), etc.

Compiler 104 may be invoked in any manner, such as by a command line, a graphical user interface, etc. A "-full" switch, or other switch, may be used when compiler 104 is invoked to perform a full compile. Compiler 104 is configured to receive and compile source code 110 to generate fully optimized machine code 112. In particular, compiler 104 is configured to transform source code 110 into fully optimized machine code 112 in the form of another computer language, typically having a binary form, referred to as machine code or object code. In some cases, compiler 104 may include multiple stages, and may first convert source code 110 into an intermediate form (e.g., an intermediate language), which is subsequently converted into fully optimized machine code 112.

Compiler 104 performs one or more types of optimizations on source code 110 when generating fully optimized machine code 112. An optimized build results in machine code that is semantically equivalent to machine code generated without optimizations, but is configured in a way that fewer resources are used during execution of the optimized machine code (e.g., less memory, fewer procedure calls, etc.). Examples of optimizations that may be performed include loop optimizations, data-flow optimizations, SSA-based optimizations, code-generator optimizations, functional language optimizations, interprocedural optimizations, and/or further types of optimizations that would be known to persons skilled in the relevant art(s). Many specific types of optimizations exist. For example, "inlining" may be performed, where a callee function called by a caller function is copied into the body of the caller function. In another example of a specific optimization, "common subexpression elimination" may be performed, where a single instance of code is used for a quantity that is computed multiple times in source code.

Fully optimized machine code 112 may be included in a file (e.g., an object or ".obj" file), or may be created/stored in another form, to form an executable program or application. As shown in FIG. 1, fully optimized machine code 112 may be stored in storage 124 of computing device(s) 118.

Debugger tool 106 may receive fully optimized machine code 112. Debugger tool 106 is configured to run a debugger (or "debug", "debugging") session on the application represented by fully optimized machine code 112. In a debugger session, a developer may be enabled to step through the execution of code of fully optimized machine code 112, while viewing the values of variables, arrays, attributes, and/or outputs (e.g., contents of registers, a GUI, etc.) generated by the execution of fully optimized machine code 112. In this manner, a developer may be able to test or troubleshoot ("debug") source code 110, making edits to source code 110 using internal code editor 122 and/or code editor 102 based on the results of the debugger session. The modified version of source code 110 may be compiled by compiler 104 and received by debugger tool 106 for further debugging. Debugger tool 106 may include one or more processors (e.g., a central processing unit (CPU)), physical and/or virtual, that execute(s) fully optimized machine code 112.

As shown in FIG. 1, code editor 102 may include marker interface 120. Marker interface 120 is an interface provided by code editor 102 to let a developer mark source code. In particular, marker interface 120 may be configured to enable a user to mark a portion of source code 110 for which to disable optimized compilation. In an embodiment, marker interface 120 is configured to enable the user to mark source code to disable optimized compilation on a function-by-function basis in source code 110.

Marker interface 120 may be any type of user interface that includes any number of user interface elements, including a graphical user interface, a touch interface, a voice control interface, a haptic interface, a gesture interface, etc. In an embodiment, a developer may interact with marker interface 120 to mark a function for which to disable optimized compilation. For instance, marker interface 120 may display a user interface element such as a checkbox, a toggle switch, a button, a pull down menu, or another user interface element for a function of source code displayed by code editor 102. The developer may interact with the user interface element to select the function for compilation without optimizations.

As such, source code editor 102 may generate marked source code 114, which is a marked version of source code 110 with indications of one or more functions for which to disable optimized compilation. For instance, comments, tags, special characters, attributes, and/or other markings may be inserted and/or modified in marked source code 114 to indicate the one or more marked functions. Each marked function may be individually marked in marked source code 114, a table indicating all marked functions may be maintained in a header or other location of marked source code 114, and/or marked functions may be indicated in other ways in marked source code 114.

Compiler 104 is configured to receive and compile marked source code 114 to generate partially optimized machine code 116. Partially optimized machine code 116 a partially optimized compiled representation of marked source code 114, with a non-optimized portion corresponding to the marked function(s) of marked source code 114, and a fully optimized remaining portion. Compiler 104 may compile marked source code 114 in this manner using any suitable compilation technique, including incremental compilation as described herein.

As shown in FIG. 1, compiler 104 includes incremental compilation enabler 108. Incremental compilation enabler 108 enables compiler 104 to perform incremental compilation, which is a compilation of portions of source code (e.g., marked portions, portions affected by modifications thereto, etc.) rather than a full compilation of the source code, which can take significantly longer.

Incremental compilation enabler 108 enables compiler 104 to compile marked source code 114 into machine code faster than source code 110 was originally compiled to generate machine code 112. This is because just the marked functions of source code 114, and any other functions that are affected by the marked functions, are recompiled and included in partially optimized machine code 116. The functions of marked source code 114 that are unrelated to the marked functions do not need to be recompiled. Instead the optimized compiled versions of these unrelated functions (in fully optimized machine code 112) may be used in partially optimized machine code 116. This leads to faster generation of partially optimized machine code 116 from marked source code 114. Faster compilation enhances developer productivity, as less time is spent by developers waiting for their code to compile.

Debugger tool 106 may receive partially optimized machine code 116. Debugger tool 106 is configured execute partially optimized machine code 116 to run a debugger session on the application represented by partially optimized machine code 116. For the portions of partially optimized machine code 116 that are not optimized, the developer has an enhanced debugging session, where the developer has an easier time co-relating instructions in the partially optimized machine code 116 to instructions of marked source code 114.

The developer may decide to edit marked source code 114 as a result of the debugging session performed on partially optimized machine code 116. Accordingly, the developer may interact with code editor 102 to generate modified marked source code 126. The developer may make any number of modifications to variables and/or functions in marked source code 114 to generate modified marked source code 126. Compiler 104 may receive modified marked source code 126 for compilation, to generate modified partially optimized machine code 128. In a similar manner as described above, incremental compilation enabler 108 may enable compiler 104 to compile modified marked source code 126 into modified partially optimized machine code 128 in a more efficient manner. This is because just the edited functions of modified marked source code 126, and any other functions that are affected by the marked functions, can be recompiled and used in modified partially optimized machine code 128. The functions of modified marked source code 126 that are unrelated to the marked functions do not need to be recompiled, and their compiled versions may be used from partially optimized machine code 116.

Figure 2:
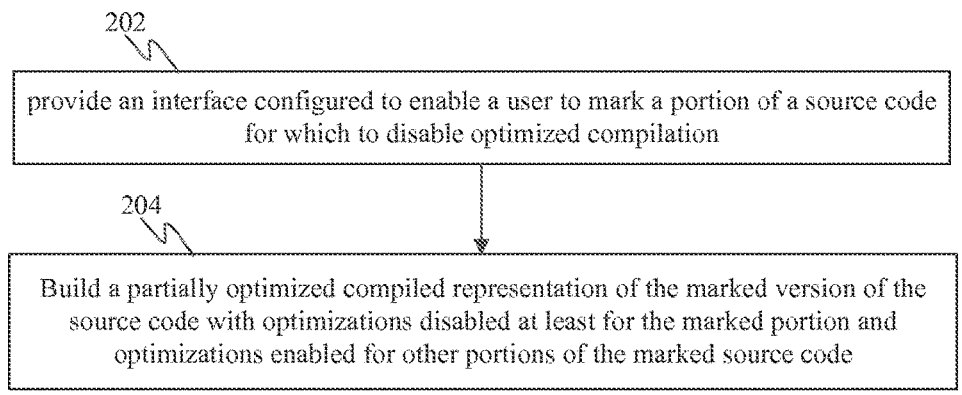
FIG. 2 shows a flowchart providing a process to disable optimized compilation for a portion of source code, and to compile the source code, according to an example embodiment.

B. Further Example Embodiments for Marking and Incrementally Compiling Marked Code Development system 100 of FIG. 1 may enable the marking of code, and the compiling of the code in a partially optimized manner to enhance debugging of the code, in various ways. For instance, in an embodiment, development system 100 may operate according to FIG. 2. FIG. 2 shows a flowchart 200 providing a process to disable optimized compilation for a portion of source code, and to compile the source code, according to an example embodiment. Flowchart 200 is described as follows with respect to FIG. 1. Further structural and operational embodiments will be apparent to persons skilled in the relevant art(s) based on the following description.

Flowchart 200 begins with step 202. In step 202, an interface is provided that is configured to enable a user to mark a portion of a source code for which to disable optimized compilation. As described above with respect to FIG. 1, code editor 102 may include marker interface 120. Marker interface 120 is an interface provided by code editor 102 to let a developer mark source code. In particular, marker interface 120 may be configured to enable a user to mark a portion of source code 110 for which to disable optimized compilation. In an embodiment, marker interface 120 is configured to enable the user to mark source code to disable optimized compilation on a function-by-function basis in source code 110. As described above, marker interface 120 may be used to mark source code 110 to generate marked source code 114.

In step 204, a partially optimized compiled representation of the marked version of the source code is built with optimizations disabled at least for the marked portion and optimizations enabled for other portions of the marked source code. In an embodiment, Compiler 104 is configured to receive and compile marked source code 114 to generate partially optimized machine code 116. Partially optimized machine code 116 a partially optimized compiled representation of marked source code 114, with a non-optimized portion corresponding to the marked function(s) of marked source code 114, and a fully optimized remaining portion. For instance, compiler 104 may include incremental compilation enabler 108 to enable incremental compilation to be performed, where portions of source code (e.g., marked portions, portions affected by modifications thereto, etc.) are recompiled rather than a full compilation of the source code, which can take significantly longer. Compiler 104 may insert the recompiled portions into fully optimized machine code 112 (in place of the optimized machine code versions of the marked portions) to generate partially optimized machine code 116.

Note that partially optimized machine code 116 may be generated after a debugger session has been initiated on fully optimized machine code 112, or without a debugger session being initiated on fully optimized machine code 112 at all. For instance, in an embodiment, compiler 104 may generate fully optimized machine code 112 based on source code 110, debugger tool 106 may receive fully optimized machine code 112 to begin a debug session, the developer may edit source code 110 during the debug session to generate marked source code 114, and partially optimized machine code 116 may then be generated by compiler 104 from marked source code 114 and fully optimized machine code 112. Alternatively, in another embodiment, the developer may edit source code 110 to generate marked source code 114 prior to beginning a debug session, compiler 104 may generate fully optimized machine code 112, and then generate partially optimized machine code 116 from marked source code 114 and fully optimized machine code 112, and the debug session may be initiated by debugger tool 106 on partially optimized machine code 116.

Figure 3:
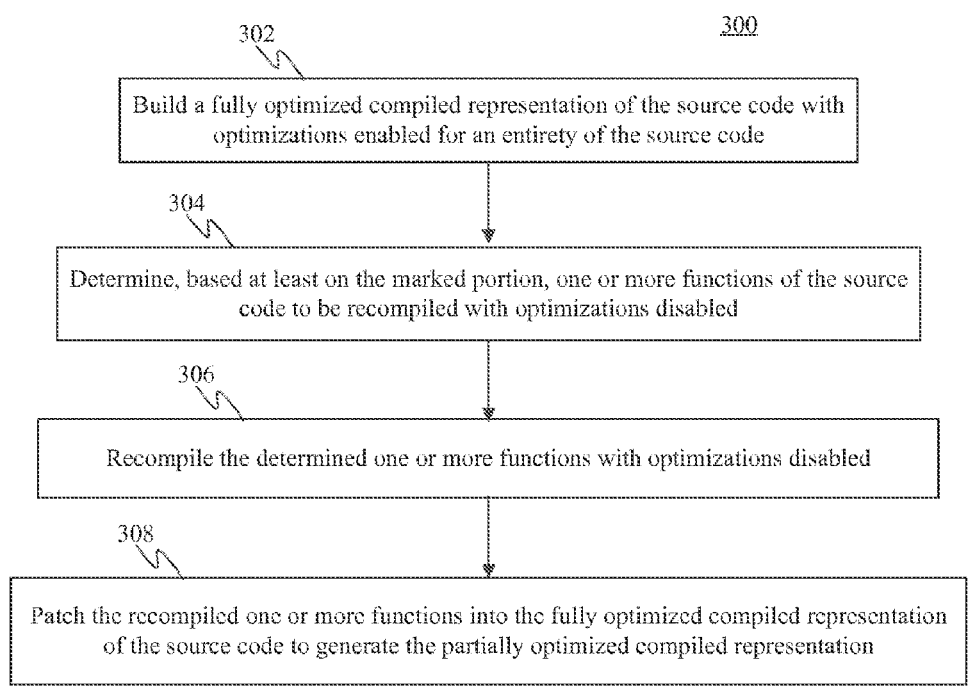
FIG. 3 shows a flowchart providing a process for compiling source code in which optimized compilation of some functions of the source code is disabled, according to an example embodiment.
Figure 4:
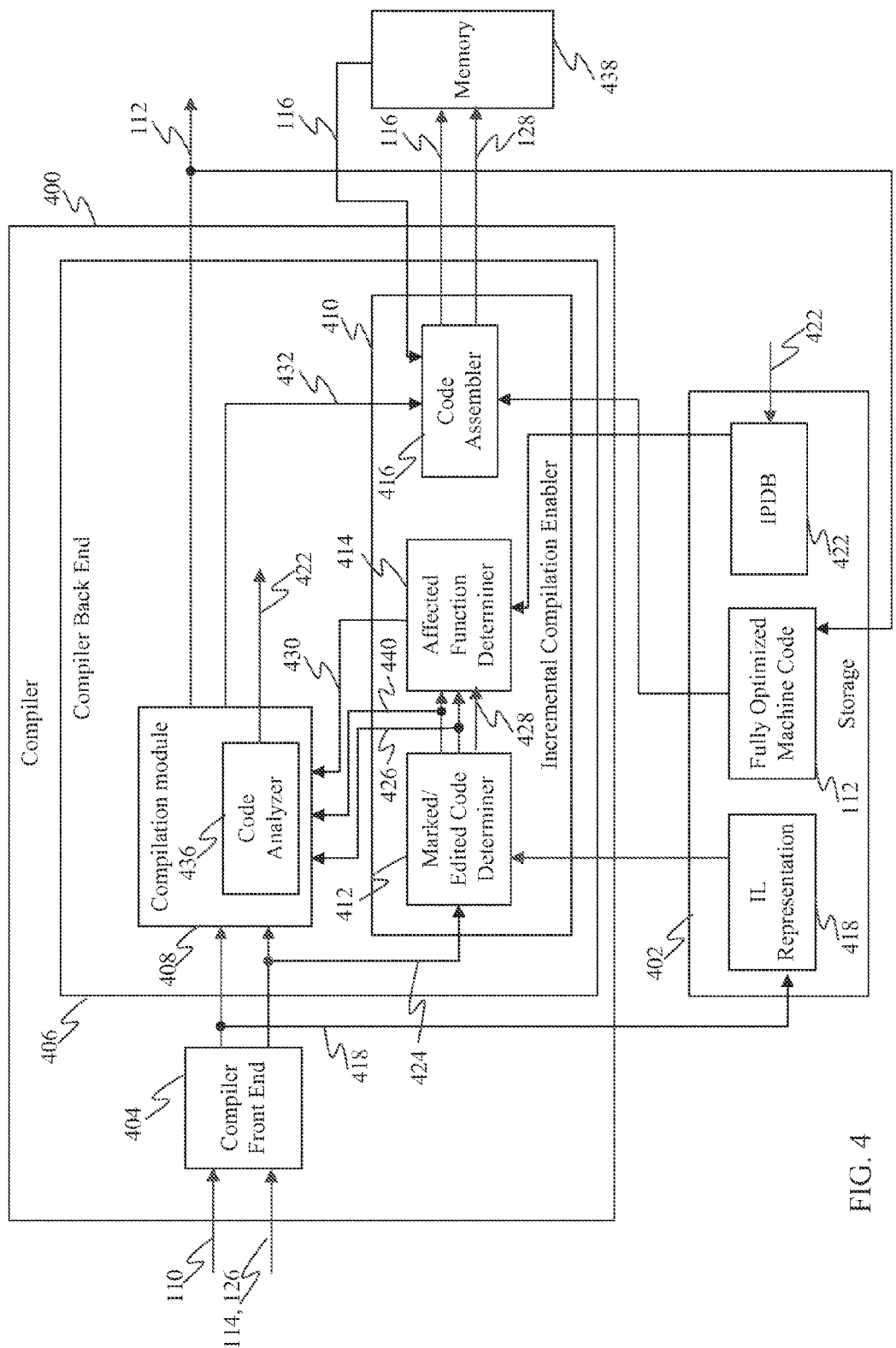
FIG. 4 shows a block diagram of a compiler configured to perform full and incremental compilation of source code, according to an example embodiment.

Compiler 104 may be configured in various ways, and step 204 may be performed in various ways in embodiments. For instance, FIG. 3 shows a flowchart 300 providing a process for compiling source code in which optimized compilation of some functions of the source code is disabled, according to an example embodiment. Flowchart 300 of FIG. 3 is an example of step 204 of FIG. 2. Furthermore, FIG. 4 shows a block diagram of a compiler 400 configured to perform full and incremental compilation of source code, according to an example embodiment. Compiler 400 of FIG. 4 is an example of compiler 104 of FIG. 1. As shown in FIG. 4, compiler 400 is communicatively coupled with storage 402. Furthermore, as shown in FIG. 4, compiler 400 includes a compiler front end 404 and a compiler back end 406. Compiler back end 406 includes a compilation module 408 and an incremental compilation enabler 410. Incremental compilation enabler 410 is an example of incremental compilation enabler 108 of FIG. 1. Incremental compilation enabler 410 includes a marked/edited code determiner 412, an affected function determiner 414, and a code assembler 416. Compilation module 408 includes a code analyzer 436.

Compiler 400 is described with respect to flowchart 300 for purposes of illustration. Further structural and operational embodiments will be apparent to persons skilled in the relevant art(s) based on the following description of flowchart 300 and compiler 400. Note that the steps of flowchart 300 do not necessarily have to occur in the order shown, as the order shown is provided for ease of illustration, and not for reasons of limitation.

Flowchart 300 of FIG. 3 begins with step 302. In step 302, a fully optimized compiled representation of the source code with optimizations enabled is built for an entirety of the source code. For example, with reference to FIG. 4, compiler front end 404 may receive source code 110. Source code 110 contains program code written in a programming language, such as a high level programming language (e.g., C, C++, Java, etc.). Compiler front end 404 is configured to generate an intermediate language (IL) representation 418 of received source code, such as source code 110. Compiler front end 404 may additionally perform optional functions such as verifying syntax and semantics, performing type checking, stripping out comments, etc., to generate IL representation 418.

IL representation 418 generated by compiler front end 404 is an IL version of source code 110 that includes code-improving transformations relative to a high level programming language used for source code 110. Source code 110 may be converted into code of any suitable intermediate language by compiler front end 404, including C, Microsoft®'s Common Intermediate Language (CIL), etc. Accordingly, compiler front end 404 may be configured in any manner to convert source code 110 to IL representation 418, as would be known to persons skilled in the relevant art(s).

Furthermore, as shown in FIG. 4, compiler back end 406 receives IL representation 418. Compiler back end 406 is configured to perform full compilation of received IL code as well as incremental compilation of received IL code. For instance, with respect to IL representation 418, compiler back end 406 uses compilation module 408 to perform full compilation. In particular, compilation module 408 receives IL representation 418, and is configured to compile code of IL representation 418, with optimizations, into fully compiled machine code 112. Compilation module 408 may be configured to compile received IL code into compiled machine code in any manner, with any number of optimizations described elsewhere herein or otherwise known. Fully compiled machine code 112 may be included in a file (e.g., an object file), or may be created/stored in another form, to form an executable program or application that may be executed by one or more processors. Furthermore, debugger tool 106 of FIG. 1 may receive and debug fully compiled machine code 112.

As shown in FIG. 4, IL representation 418 and fully compiled machine code 112 may be stored in storage 402. Storage 402 is an example of storage 124 in FIG. 1. Storage 402 may include one or more of any type of storage medium/device to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device. Note that IL representation 418 is optionally stored in storage 402.

In an embodiment, compiler back end 406 may configured to generate information regarding source code 110 that may be used to assist incremental compilation. For instance, step 302 may include a step 502 shown in FIG. 5. In step 502, an incremental program database is generated that at least indicates dependencies between functions of the fully optimized compiled representation of the source code. For instance, step 502 may be performed by code analyzer 436. Code analyzer 436 is configured to analyze IL representation 418 to determine functions of IL representation 418 (and thereby, of source code 110) that are affected by changed functions and/or variables. As shown in FIG. 4, IPDB (incremental program database) 422 may be generated by code analyzer 436. Code analyzer 436 may generate IPDB 422 to include function attributes and variable attributes determined from IL representation 418 in any manner described herein. As shown in FIG. 4, IPDB 422 may be stored in storage 402 (e.g., in the form of one or more files, a database, and/or any other data structure).

For instance, attributes of IL representation 418 may be determined by code analyzer 436 and stored in IPDB 422. Examples of attributes of IL representation 418 that may be determined include function attributes that are considered declared ("source") function attributes and computed function attributes. Declared attributes are attributes that are present in source code 110, and examples of declared function attributes include dllimport, dllexport, a number of formal parameters, etc. Examples of function attributes that may be computed include a checksum for each function, an indication of whether a function can throw any exceptions, etc. Still further, declared attributes and/or computed attributes may be determined for variables, and stored in IPDB 422. An example of a computed variable attribute is an indication of whether a variable always has a constant value when executing a function. Further examples of the determination of attributes of IL representation 418 are described elsewhere herein.

Note that although code analyzer 436 is shown included in compiler back end 406 (in compilation module 408) in FIG. 4, in an alternative embodiment, code analyzer 436 may be included in compiler front end 404.

Referring back to FIG. 3, in step 304, one or more functions of the source code to be recompiled with optimizations disabled is/are determined based at least on the marked portion. As described above with respect to FIG. 1, a developer may interact with marker interface 120 of source code editor 102 to mark one or more functions of source code 110 so that the marked functions are not compiled with optimizations. Marked source code 114 includes the marked functions. With reference to FIG. 4, compiler front end 404 may receive marked source code 114. Compiler front end 404 is configured to generate an intermediate language (IL) representation 424 of marked source code 114. Marked/edited code determiner 412 receives marked source code 114. Marked/edited code determiner 412 is configured to determine the marked functions in IL representation 424 (or directly in marked source code 114). For instance, marked/edited code determiner 412 may be configured to parse in IL representation 424 (or marked source code 114) for the comments, tags, special characters, a table of marked functions, etc., that indicate the functions that were marked. The determined marked functions are to be compiled without optimizations by compilation module 408. As shown in FIG. 4, marked/edited code determiner 412 outputs marked functions 440, which indicates the determined marked functions.

Furthermore, functions of marked source code 114 that are affected by the marked functions are determined so that those affected functions are also compiled without optimizations by compilation module 408. Those affected functions may be determined in various ways.

For instance, FIG. 6 shows a flowchart 600 providing a process for determining functions to be compiled with optimizations disabled using a dependence graph, according to an example embodiment. In an embodiment, flowchart 600 may be performed by compiler 400 of FIG. 4. Further structural and operational embodiments will be apparent to persons skilled in the relevant art(s) based on the following description of flowchart 600. Note that the steps of flowchart 600 do not necessarily have to occur in the order shown.

Figure 7:
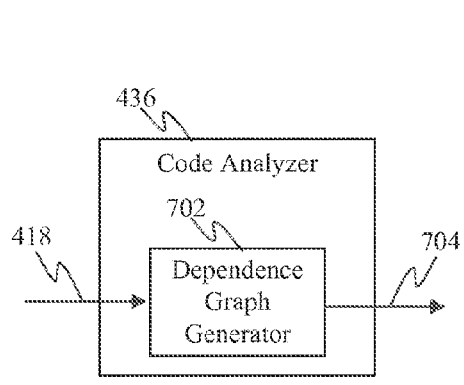
FIG. 7 shows a block diagram of a code analyzer configured to generate a dependence graph, according to an example embodiment.

Flowchart 600 of FIG. 6 begins with step 602. In step 602, a dependence graph is generated for the source code based on the incremental program database. For instance, FIG. 7 shows a block diagram of code analyzer 436, according to an example embodiment. As shown in FIG. 7, code analyzer 436 includes a dependence graph generator 702. Dependence graph generator 702 is configured to generate a dependence graph 704 based on IPDB 422 that includes data that represents dependencies between functions and variables of source code 110. These dependencies may be traversed to determine other functions affected by marked functions present in marked source code 114. Dependence graph 704 may be stored in IPDB 422 (e.g., in storage 402) or elsewhere. Dependence graph 704 may be generated at any time, including at a time source code 110 is compiled and/or IPDB 422 is generated (e.g., during step 502 of FIG. 5) or at another time.

Figure 9:
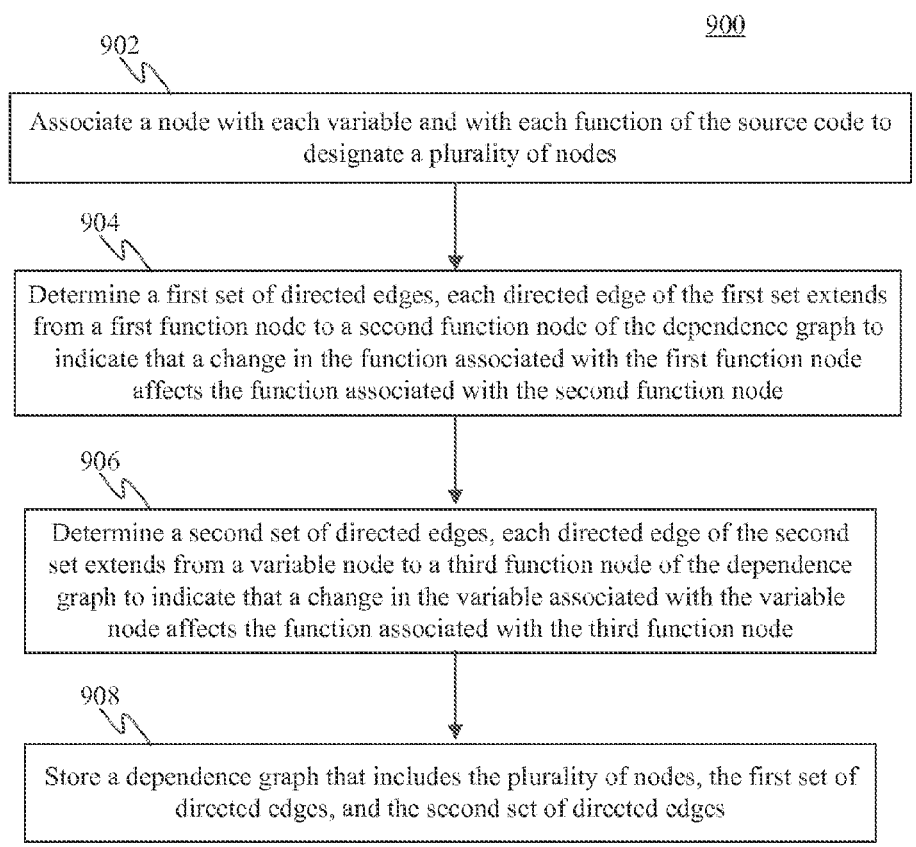
FIG. 9 shows a flowchart providing a process for generating a dependence graph, according to an example embodiment.

Dependence graph generator 702 may operate in any manner to perform its functions. For instance, FIG. 9 shows a flowchart 900 providing a process for generating a dependence graph, according to an example embodiment. In an embodiment, dependence graph generator 702 may operate according to flowchart 900. Dependence graph generator 702 is described with respect to flowchart 900 for purposes of illustration. Further structural and operational embodiments will be apparent to persons skilled in the relevant art(s) based on the following description of flowchart 900 and dependence graph generator 702. Note that the steps of flowchart 900 do not necessarily have to occur in the order shown.

Flowchart 900 of FIG. 9 begins with step 902. In step 902, a node is associated with each variable and with each function of the source code to designate a plurality of nodes. In an embodiment, dependence graph generator 702 parses IL representation 418 for all functions. Dependence graph generator 702 may identify a function in IL representation 418 in any manner, including by identifying the declaration of a function (e.g., a function name followed by "( )"), identifying the body of a function (e.g., enclosed in bracket symbols "{", "}"), and/or by identifying other parts of a function. Dependence graph generator 702 may also identify a global variable in IL representation 418 in any manner, including by identifying the declaration of a global variable (e.g., "extern int globalvariable=1;"), etc. Dependence graph generator 702 is configured to identify each function and each variable at least with a corresponding node (e.g., with a node identifier) in dependence graph 704.

For instance, each node in dependence graph 704 may be associated with one or more attributes derived from IPDB 422, such as a name, a module identifier, and a symbol index. Function nodes in dependence graph 704 may further include one or more of the attributes of a checksum, an address taken, a tuple count, a Dllimport, a function signature, a noexcept, nothrow, dead catch information, etc. Variable nodes in dependence graph 704 may further include one or more the attributes of a constant, read only, volatile, address taken, size, dllimport, etc.

In step 904, a first set of directed edges is determined, each directed edge of the first set extends from a first function node to a second function node of the dependence graph to indicate that a change in the function associated with the first function node affects the function associated with the second function node. In an embodiment, dependence graph generator 702 analyzes IL representation 418 to determine dependencies between functions. For instance, dependence graph generator 702 may determine when a first function (callee function) is called by a second function (caller function), such that changes in the first function affect the second function. Thus, dependence graph generator 702 may be configured to parse the structure of each function in IL representation 418 to determine what other function(s) the function calls, if any. Dependence graph generator 702 is configured to identify each function call as a "directed edge" (e.g., with an edge identifier) in dependence graph 704. Each directed edge identifies a first function node and a second function node, to indicate that the function associated with the second function node is dependent on (e.g., calls) the function associated with the first function node. Furthermore a directed edge between functions may indicate a type of dependency between the functions (e.g., an inline edge from a first function node to a second function node, where the function associated with the second function node inlines the function associated with the first function node, etc.).

In step 906, a second set of directed edges is determined, each directed edge of the second set extends from a variable node to a third function node of the dependence graph to indicate that a change in the variable associated with the variable node affects the function associated with the third function node. In an embodiment, dependence graph generator 702 analyzes IL representation 418 to determine dependencies between variables and functions. For instance, dependence graph generator 702 may determine when a variable is used by a function, such that changes in the variable (e.g., a change to a variable attribute) affect the function. Thus, dependence graph generator 702 may be configured to parse the structure of each function in IL representation 418 to determine what variables the function uses, if any. Dependence graph generator 702 is configured to identify each variable-function relationship as a "directed edge" (e.g., with an edge identifier) in dependence graph 704. Each directed edge identifies a variable node and a function node, to indicate that the function associated with the function node is dependent on (e.g., uses) the variable associated with the variable node.

In step 908, a dependence graph is stored that includes the plurality of nodes, the first set of directed edges, and the second set of directed edges. As shown in FIG. 7, dependence graph generator 702 outputs dependence graph 704. Dependence graph 704 may be stored in IPDB 422 in storage 402, as shown in FIG. 4.

Note that dependence graph generator 702 may generate dependence graph 704 at any time, including at a time at which IL representation 418 is compiled into fully compiled machine code 112 by compilation module 408, at a time prior to generation of IL representation 424, or at a time after IL representation 424 is generated.

Figure 10:
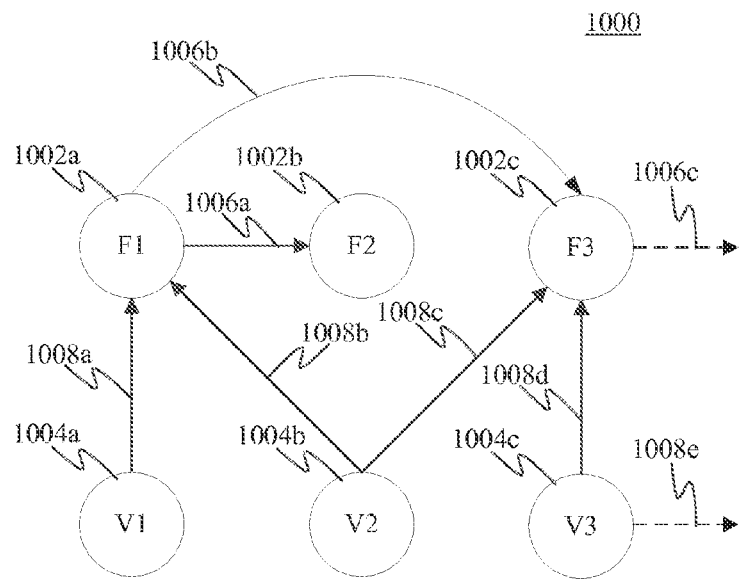
FIG. 10 shows a graphical representation of a portion of an exemplary dependence graph, according to an embodiment.

For illustrative purposes, FIG. 10 shows a graphical representation of a portion of an exemplary dependence graph 1000, according to an embodiment. As shown in FIG. 10, dependence graph 1000 includes nodes and directed edges, including function nodes 1002*a*-1002*c*, variable nodes 1004*a*-1004*c*, and directed edges 1006*a*-1006*c* and 1008*a*-1008*e*. Each of function nodes 1002-1002*c* is associated with a corresponding one of functions F1-F3 included in IL representation 418. Each of variable nodes 1004-1004*c* is associated with a corresponding one of variables V1-V3 included in IL representation 418. Function nodes 1002-1002*c* and variable nodes 1004-1004*c* may be identified by dependence graph generator 702 in step 902 of flowchart 900. Three functions and three variables are shown in FIG. 10 for purposes of brevity, and further numbers of functions and variables may be present (as indicated by dotted line directed edges 1006*c* and 1008*e*).

Furthermore, each of directed edges 1006*a*-1006*c* extends from a first function node to a second function node. For instance, directed edge 1006*a* extends from function node 1002*a* to function node 1002*b*, indicating that a change in function F1 associated with function node 1002*a* affects function F2 associated with function node 1002*b* (F2 is dependent on F1). Directed edges 1006*a*-1006*c* may be identified by dependence graph generator 702 in step 904 of flowchart 900.

Each of directed edges 1008*a*-1008*e* extends from a variable node to a function node. For instance, directed edge 1008*a* extends from variable node 1004*a* to function node 1002*a*, indicating that a change in variable V1 associated with variable node 1004*a* affects the function F1 associated with function node 1002*a* (F1 is dependent on V1). Directed edges 1008*a*-1008*e* may be identified by dependence graph generator 702 in step 906 of flowchart 900.

Referring back to FIG. 6, in step 604, the dependence graph is traversed from any functions and any variables included in the marked portion to determine a set of affected functions. In an embodiment, affected function determiner 414 is configured determine a set of functions present in source code 110 that are affected by marked functions 440 of marked source code 114. Affected function determiner 414 may make this determination in any manner.

Figure 8:
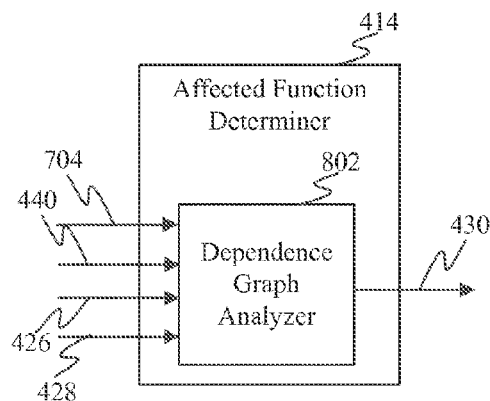
FIG. 8 shows a block diagram of an affected function determiner configured to analyze a dependence graph, according to an example embodiment.

For instance, FIG. 8 shows a block diagram of affected function determiner 414, according to an example embodiment. As shown in FIG. 8, affected function determiner 414 includes a dependence graph analyzer 802. Dependence graph analyzer 802 is configured to analyze dependence graph 704 to determine functions affected by marked functions 440.

Figure 11:
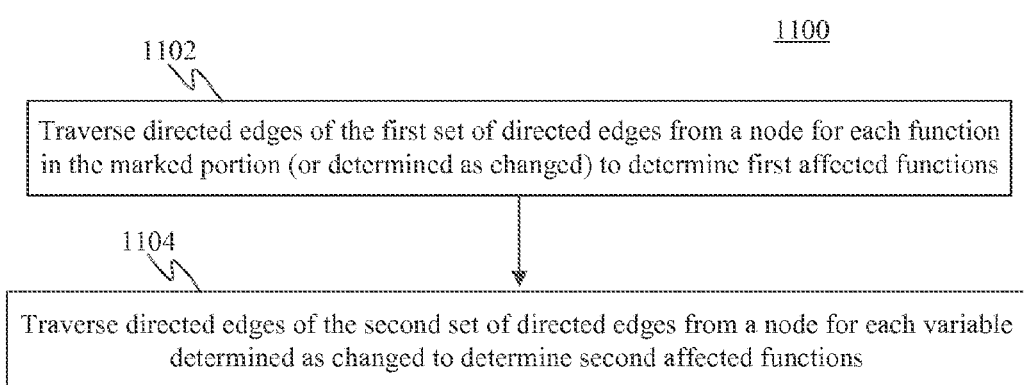
FIG. 11 shows a flowchart providing a process for analyzing a dependence graph, according to an example embodiment.

Dependence graph analyzer 802 may operate in any manner to perform its functions. For instance, FIG. 11 shows a flowchart 1100 providing a process for analyzing a dependence graph, according to an example embodiment. In an embodiment, dependence graph analyzer 802 may operate according to flowchart 1100. Dependence graph analyzer 802 is described with respect to flowchart 1100 for purposes of illustration. Further structural and operational embodiments will be apparent to persons skilled in the relevant art(s) based on the following description of flowchart 1100 and dependence graph analyzer 802.

Flowchart 1100 of FIG. 11 begins with step 1102. In step 1102, directed edges of the first set of directed edges are traversed from a node for each function in the marked portion to determine first affected functions. In an embodiment, for each marked function indicated in marked functions 440, dependence graph analyzer 802 is configured to find the corresponding function node in dependence graph 704. Dependence graph analyzer 802 traverses any directed edges indicated in dependence graph 704 from the function node to determine any (dependent) function node(s). These dependent function nodes are indicated in a set of first affected functions.

For example, with reference to FIG. 10, if function F1 is a marked function, dependence graph analyzer 802 identifies and traverses directed edges 1006*a* and 1006*b* to function nodes 1002*b* and 1002*c*, respectively, to determine that functions F2 and F3 are dependent on function F1. Functions F2 and F3 are thereby included in the first affected functions.

Referring back to FIG. 11, step 1104 is not performed with respect to determining affected functions based on marked source code.

Referring back to FIG. 6, in step 606, any functions in the marked portion and any functions in the determined set of affected functions are included in a set of functions to be recompiled with optimizations disabled. As shown in FIG. 8, dependence graph analyzer 802 generates an affected set of functions 430. Affected set of functions 430 includes the first affected functions determined by dependence graph analyzer 802 in step 1102. FIG. 4 also shows second set of functions 430 output by affected function determiner 414. As shown in FIG. 4, compilation module 408 receives marked functions 440 and affected functions 430, which comprise the set of functions to be recompiled with optimizations disabled.

Referring back to FIG. 3, in step 306, the determined one or more functions is/are recompiled with optimizations disabled. As shown in FIG. 4, compilation module 408 receives marked functions 440 and affected functions 430. Compilation module 408 is configured to compile the functions included in marked functions 440 and affected set of functions 430 without optimizations disabled to generate compiled functions 432. Compilation module 408 may be configured to compile marked functions 440 and affected set of functions 430 in any manner, including according to techniques described elsewhere herein or otherwise known.

Note that in an embodiment, code analyzer 436 may be configured to generate an IPDB 422 for IL representation 424 of marked source code 114, in a similar manner as described above for IL representation 418 with respect to step 502 (FIG. 5). The IPDB 422 generated for IL representation 424 of marked source code 114 may be maintained in memory 438, in storage 402, or elsewhere.

In step 308, the recompiled one or more functions are patched into the fully optimized compiled representation of the source code to generate the partially optimized compiled representation. As shown in FIG. 4, code assembler 416 of incremental compilation enabler 410 receives fully compiled machine code 112 and compiled functions 432. Code assembler 416 is configured to insert compiled functions 432 in fully compiled machine code 112 to generate partially optimized machine code 116. In particular, code assembler 416 may be configured to insert compiled functions 432 in fully compiled machine code 112 in place of the functions indicated in marked functions 440 (functions that were marked by the developer for no optimizations) and second set of functions 430 (functions that were affected by the marked functions). In this manner, partially optimized machine code 116 is generated as a partially compiled representation of marked source code 114 without recompiling modified source code 114 in its entirety.

Note that in an embodiment, partially optimized machine code 116 may be stored in a memory 438 (e.g., a cache memory in a memory device, or other short term memory) and subsequently for debug operations as described herein. In this manner, when debug operations are finished, partially optimized machine code 116 is not maintained, and instead, fully optimized machine code 112 is maintained for subsequent use as an application, if desired.

Figure 12:
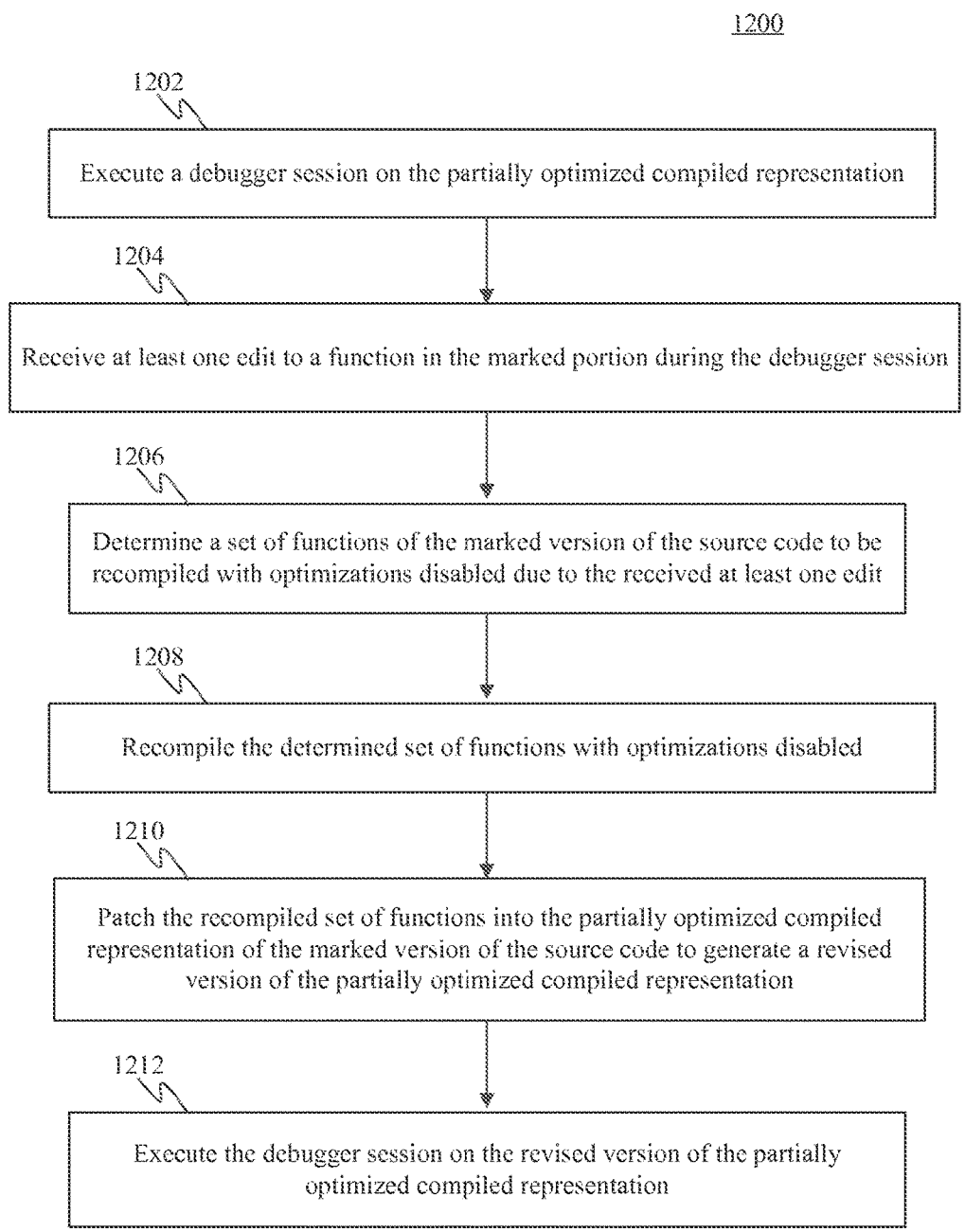
FIG. 12 shows a flowchart providing a process for performing incremental compilation of source code edited during a debug session, according to an example embodiment.

C. Further Example Embodiments for Incrementally Compiling Marked Code During a Debug Session Development system 100 of FIG. 1 may enable the debugging of marked source code, and the editing and recompiling of marked source code to enhance the debugging of the source code, in various ways. For instance, in an embodiment, development system 100 may operate according to FIG. 12. FIG. 12 shows a flowchart 1200 providing a process for performing incremental compilation of source code edited during a debug session, according to an example embodiment. Flowchart 1200 is described as follows with respect to FIGS. 1 and 4. Further structural and operational embodiments will be apparent to persons skilled in the relevant art(s) based on the following description.

Flowchart 1200 begins with step 1202. In step 1202, a debugger session is executed on the partially optimized compiled representation. As described above, Debugger tool 106 of FIG. 1 may receive partially optimized machine code 116. Debugger tool 106 is configured to run a debugger session on partially optimized machine code 116. For the portions of partially optimized machine code 116 that are not optimized, the developer has an enhanced debugging session, where the developer has an easier time co-relating instructions in the partially optimized machine code 116 to instructions of marked source code 114.

In step 1204, at least one edit to a function in the marked portion is received during the debugger session. As described above, a developer may decide to edit marked source code 114 as a result of the debugging session performed on partially optimized machine code 116. Accordingly, the developer may interact with code editor 102 to generate modified marked source code 126. Modified marked source code 126 may include edits made to one or more functions that are marked (to disable compiler optimizations), and/or may include edits made to one or more functions that are not marked (and therefore have compiler optimizations enabled).

In step 1206, a set of functions of the marked version of the source code is determined to be recompiled with optimizations disabled due to the received at least one edit. In an embodiment, compiler 104 of FIG. 1 may determine a set of marked functions of marked source code 114 to be recompiled with optimizations disabled due to the edits made in modified marked source code 126 relative to marked source code 114. Furthermore, compiler 104 of FIG. 1 may determine a set of unmarked functions of marked source code 114 to be recompiled with optimizations. For instance, with reference to FIG. 4, incremental compilation enabler 406 may be configured to determine the set of functions to be recompiled with optimizations disabled and/or the set of functions to be recompiled with optimizations enabled. Incremental compilation enabler 406 may determine the functions to be recompiled in any manner.

For instance, with reference to FIG. 4, compiler front end 404 may receive modified marked source code 126. Compiler front end 404 is configured to generate IL representation 424 of modified marked source code 126. Compiler back end 406 receives IL representation 424. Incremental compilation enabler 406 is configured to analyze IL representation 424 to determine the set of functions of marked source code 114 to be recompiled with optimizations disabled.

For instance, as shown in FIG. 4, marked/edited code determiner 412 of incremental compilation enabler 410 may receive revised IL representation 424. Marked/edited code determiner 412 is configured to determine changes that are present in revised IL representation 424 relative to the IL representation of modified marked source code 126, which indicate changes that were made by a developer in modified marked source code 126. In particular, marked/edited code determiner 412 may be configured to determine modified variables and/or functions in revised IL representation 424.

Figure 13:
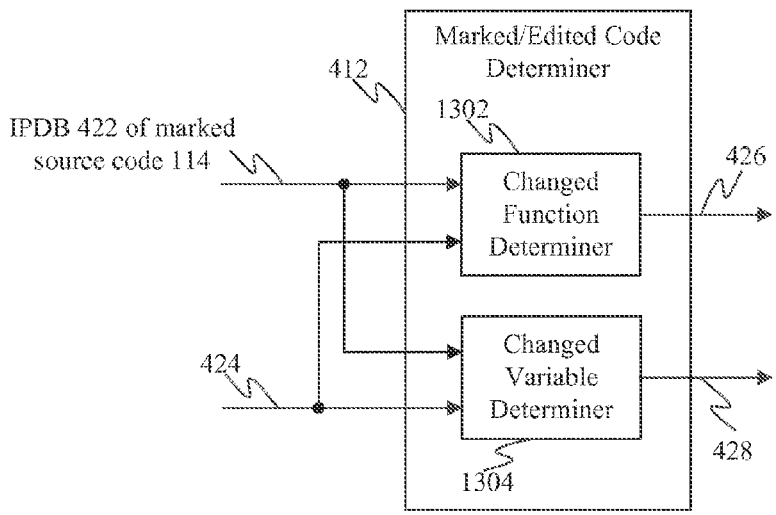
FIG. 13 shows a block diagram of a marked/edited code determiner, according to an example embodiment.

For example, FIG. 13 shows a block diagram of marked/edited code determiner 412, according to an example embodiment. As shown in FIG. 13, marked/edited code determiner 412 includes a changed function determiner 1302 and a changed variable determiner 1304. Changed function determiner 1302 is configured to compare attributes of the IL code generated from modified source code to attributes of the IL code generated from the source code (prior to the modification) to determine any functions that are changed in the modified source code. Changed variable determiner 1304 is configured to compare attributes of the IL code generated from modified source code to attributes of the IL code generated from the source code (prior to modification) to determine any variables that are changed in the modified source code. One or both of changed function determiner 1302 and changed variable determiner 1304 may be present in embodiments, depending on whether changes to functions, to variables, or to both functions and variables are to be searched for.

Figure 14:
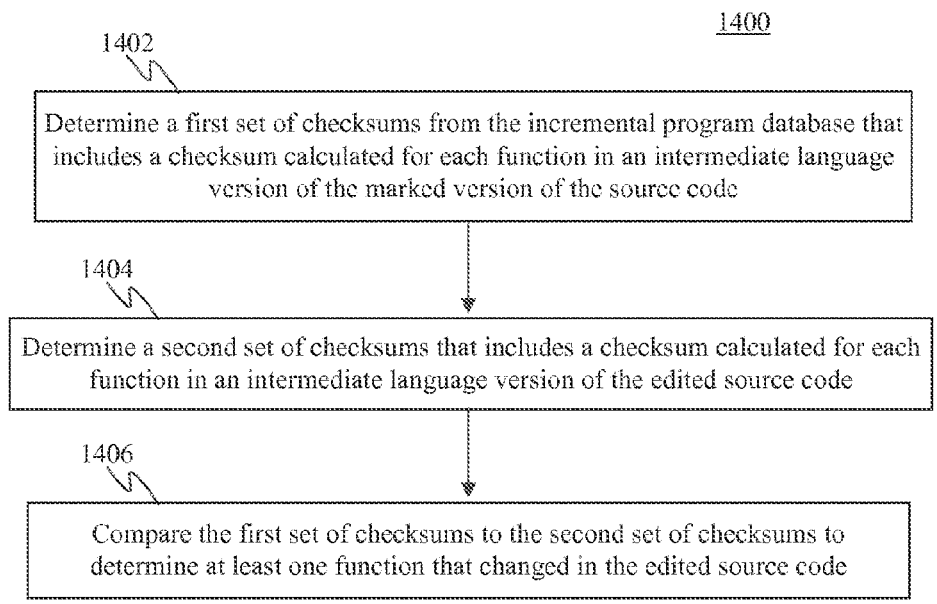
FIG. 14 shows a flowchart providing a process for detecting functions that were modified in source code, according to an example embodiment.

Changed function determiner 1302 may detect changed functions in any manner. For instance, FIG. 14 shows a flowchart 1400 providing a process for detecting functions that were modified in source code, according to an example embodiment. Changed function determiner 1302 may operate according to flowchart 1400, in an embodiment. Further structural and operational embodiments will be apparent to persons skilled in the relevant art(s) based on the following description of flowchart 1400. Note that the steps of flowchart 1400 do not necessarily have to occur in the order shown in FIG. 14.

Flowchart 1400 of FIG. 14 begins with step 1402. In step 1402, a first set of checksums is determined from the incremental program database that includes a checksum calculated for each function in an intermediate language version of the marked version of the source code. For example, as shown in FIG. 13, changed function determiner 1302 may be configured to determine a checksum from the IPDB stored for marked source code 114, and include the checksums in a first set. In an embodiment, the checksums were determined by code analyzer 436 and stored in the IPDB for marked source code 114, as described elsewhere herein.

In step 1404, a second set of checksums is determined that includes a checksum calculated for each function in the revised intermediate language representation. As shown in FIG. 13, changed function determiner 1302 receives revised IL representation 424, which is the IL representation of modified marked source code 126. Changed function determiner 1302 is configured to determine a checksum for each function in revised IL representation 424, and include the checksums in a second set. Alternatively, the checksums may be determined by compiler front end 404, code analyzer 436, or elsewhere. The second set of checksums may be maintained in any manner.

Note that the checksums may be determined in steps 1402 and 1404 in any manner. For example, in an embodiment, a checksum of a function may be determined by calculating the checksum of each tuple of the function and combining the checksums in any manner (e.g., by addition, etc.). The checksum of instruction tuples may be calculated based on the checksum of each source and destination tuple as well as the instruction opcode itself. In other embodiments, checksums may be determined for functions in other ways.

In step 1406, the first set of checksums is compared to the second set of checksums to determine at least one function that changed in the edited source code. In an embodiment, changed function determiner 1302 is configured to compare the first set of checksums to the second set of checksums. If any functions were modified or deleted, and/or any new functions were added (in modified marked source code 126 relative to marked source code 114), these differences would be reflected in the comparison of the first and second sets of checksums.

For instance, if a function were modified (e.g., a function whose source has been edited, etc.) its checksum would be different in the second set relative to the first set. This would indicate a modified function. If a function was deleted, a checksum for the function would be present in the first set, but not in the second set. If a function was added, a checksum for the function would not be present in the first set, but would be present in the second set. Accordingly, by comparing the checksums of the first and second sets, changed function determiner 1302 can determine any function changes (modifications, deletions, additions). The functions determined to be changed are indicated in first set of functions 426 shown in FIGS. 4 and 13, are included in the first set of functions determined in step 308 of flowchart 300 (FIG. 3).

Figure 15:
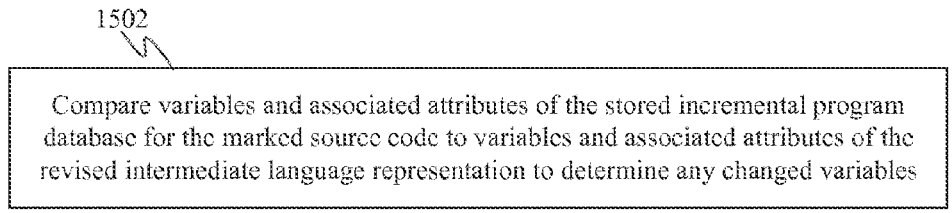
FIG. 15 shows a process for detecting variables that were modified in source code, according to an example embodiment.

Changed variable determiner 1304 may detect changed variables in any manner. For instance, FIG. 15 shows a step 1502 for detecting variables that were modified in source code, according to an example embodiment. In step 1502, variables and associated attributes of the stored incremental program database are compared to variables and associated attributes of the revised intermediate language representation to determine any changed variables. For example, as shown in FIG. 13, changed variable determiner 1304 receives IPDB 422 associated with marked source code 114 and revised IL representation 424 generated from modified marked source code 126. Changed variable determiner 1304 is configured to compare any declared variables indicated in the IPDB to any variables declared in revised IL representation 424 to determine any changed variables. For instance, if any variables were modified or deleted, and/or any new functions were added (in modified marked source code 126 relative to marked source code 114), these differences would be reflected in the comparison of the variables of the IPDB and revised IL representation 424.

For instance, if a variable were modified (e.g., a value of a declared or calculated attribute of the variable was changed, a new attribute was added to the variable, an attribute was removed from the variable, etc.), this difference is apparent when the variable is compared between the IPDB and revised IL representation 424. This would indicate a modified variable. If a variable was deleted, the variable would be present in the IPDB, but not in revised IL representation 424. If a variable was added, the variable would not be present in the IPDB, but would be present in revised IL representation 424. Accordingly, by comparing the variables of the IPDB and revised IL representation 424, changed variable determiner 1304 can determine any variable changes. The variables determined to be changed are indicated in changed variables 428 shown in FIGS. 4 and 13.

Note that the variables analyzed in step 1502 may be global variables. A global variable is a variable with global scope, such that it is visible (hence accessible) throughout source code, even when the source code is composed of multiple linked files. In such case, the global variable has a same structure (e.g., the same attribute(s)) and value throughout the source code (e.g., marked source code 114 or modified marked source code 126).

As such, the functions determined in step 1406 and the variables determined to have changed in step 1502 may affect other functions in modified marked source code 126, which therefore also have to be recompiled. Accordingly, flowchart 600 of FIG. 6 may be performed to determine the set of affected functions. Flowchart 600 of FIG. 6 is described as follows, with respect to modified marked source code 126.

In step 602 of flowchart 600, a dependence graph may be generated for marked source code 114 based on the incremental program database stored for marked source code 114 (e.g., as described above). The dependence graph may be generated for marked source code 114 by dependence graph generator 702 (FIG. 7) according to flowchart 900 (FIG. 9), or in another manner.

In step 604 of flowchart 600, the dependence graph is traversed from any functions and any variables indicated as changed in first set of functions 426 and changed variables 428, to determine a set of affected functions. The dependence graph may be traversed by dependence graph analyzer 802 of FIG. 8 according to flowchart 1100 of FIG. 11, including performing step 1102 to traverse directed edges from nodes of functions of first set of functions 426 to determine first affected functions, and performing step 1104 to traverse directed edges from nodes of variables of changed variables 428 to determine second affected functions. As shown in FIG. 8, dependence graph analyzer 802 generates a second set of functions 430. Second set of functions 430 includes the first affected functions determined by dependence graph analyzer 802 in step 1102, and includes the second affected functions determined by dependence graph analyzer 802 in step 1104. FIG. 4 shows second set of functions 430 output by affected function determiner 414.

In step 606 of flowchart 600, functions determined as changed and any functions in the determined set of affected functions are included in a set of functions to be recompiled with optimizations disabled. As shown in FIG. 4, compilation module 408 receives first set of functions 426 and affected functions 430, which comprise the set of functions to be recompiled. Functions of first set of functions 426 and affected functions 430 that are marked functions are recompiled with optimizations disabled. Functions of first set of functions 426 and affected functions 430 that are not marked functions are recompiled with optimizations enabled.

In step 1208, the determined set of functions is recompiled with optimizations disabled. As shown in FIG. 4, compilation module 408 receives first set of functions 426 and affected functions 430, which comprise the set of functions to be recompiled. Functions of first set of functions 426 and affected functions 430 that are marked functions are recompiled by compilation module 408 with optimizations disabled. Functions of first set of functions 426 and affected functions 430 that are not marked functions are recompiled by compilation module 408 with optimizations enabled. Compilation module 408 generates compiled functions 432, which includes the recompiled versions of first set of functions 426 and affected functions 430.

In step 1210, the recompiled set of functions is patched into the partially optimized compiled representation of the marked version of the source code to generate a revised version of the partially optimized compiled representation. As shown in FIG. 4, code assembler 416 of incremental compilation enabler 410 receives partially compiled machine code 116 (e.g., from memory 438) and compiled functions 432. Code assembler 416 is configured to insert compiled functions 432 in partially compiled machine code 116 to generate modified partially optimized machine code 128, which is a revised version of partially compiled machine code 116. In particular, code assembler 416 may be configured to insert compiled functions 432 in partially compiled machine code 116 in place of the functions indicated in first set of functions 426 and affected functions 430 (functions that were affected by the changed functions and variables). In this manner, modified partially optimized machine code 128 is generated as a partially compiled representation of modified marked source code 126 without recompiling modified marked source code 126 in its entirety.

In step 1212, the debugger session is executed on the revised version of the partially optimized compiled representation. Note that in an embodiment, modified partially optimized machine code 128 may be stored in a memory 438 (e.g., a cache memory in a memory device, or other short term memory) and subsequently for debug operations as described herein. For instance, debugger tool 106 of FIG. 1 may receive modified partially optimized machine code 128 for a debugger session, as described above. In this manner, when debug operations are finished, modified partially optimized machine code 128 is not maintained.

Flowchart 1200 may be subsequently re-performed for further iterations of debugging and making modifications to source code. In such case, the modified marked source code, and the partially optimized compiled representation of the modified marked source code, generated in the previous iteration of flowchart 1200 (and associated IPDB) may be used as input for the next iteration.

C. Example Embodiments for Incremental Compilation for LTCG

Figure 16:
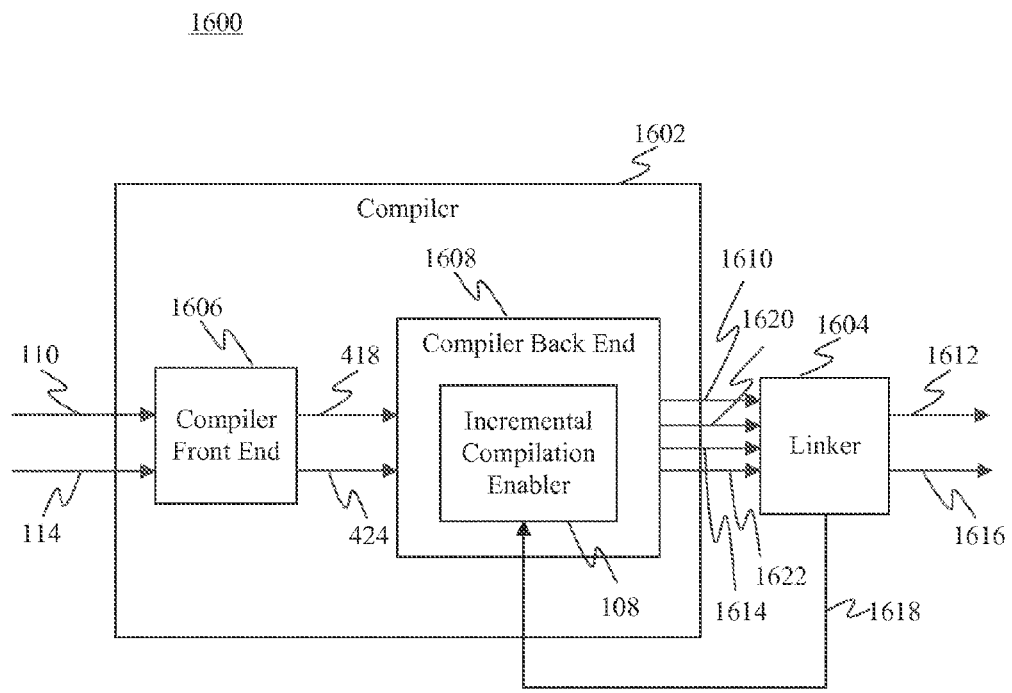
FIG. 16 shows a block diagram of a build system for incremental compilation that includes a complier and a linker, according to an example embodiment.

Note that the embodiments of compilers described herein may be implemented in any type of compile or build configuration, which may or may not include linkers. For instance, FIG. 16 shows a block diagram of a build system 1600 that includes a complier 1602 and a linker 1604, according to an example embodiment. Build system 1600 is configured to perform link time code generation (LTCG), also referred to as whole program optimization. According to LTCG, source code is received in the form of multiple separate source code files. The multiple separate source code files together form a whole program for compilation. All of the source code files are compiled together by build system 1600 to form a single executable. An example of the operation of build system 1600 to perform LTCG is described as follows.

As shown in FIG. 16, compiler 1602 includes a compiler front end 1606 and a compiler back end 1608. Compiler front end 1606 may be configured similarly to compiler front end 404 of FIG. 4, and compiler back end 1608 may be configured similarly to compiler back end 406 of FIG. 4, or they may be configured according to other embodiments. Compiler back end 1608 includes incremental compilation enabler 108. In an embodiment, incremental compilation enabler 108 may be configured similarly to incremental compilation enabler 410 shown in FIG. 4, or may be configured according to another embodiment.

Source code 110 is received by compiler front end 1606 in the form of multiple source code files (e.g., ".c" files, ".cpp" files, etc.). Any number of source code files may be received as source code 110, including numbers of files in the ones, tens, hundreds, thousands, etc. Compiler front end 1606 converts the source code of each source code file into a corresponding IL representation file, thereby generating multiple IL representation files. The IL representation files are output by compiler front end 1606 in IL representation 418. Compiler back end 1608 receives IL representation 418. Compiler back end 1608 determines by a command line switch (e.g., "/GL"), by analysis of information in one or more of the IL representation files, or in another manner, that LTCG is invoked. Due to this, compiler back end 1608 passes the IL representation files to linker 1604 (e.g., packaged in .obj files, or other form) as packaged IL representation files 1610.

Linker 1604 receives packaged IL representation files 1610. Based on determining that IL code is contained in the files of packaged IL representation files 1610, by being invoked by a command line switch (e.g., "/LTCG"), or in another manner, linker 1604 determines that compiler back end 1608 is to be invoked to optimize the IL code across all of the IL representation files (rather than optimizing each IL representation file individually). Accordingly, linker 1604 generates an invocation signal 1618, which is received by compiler back end 1608.

Compiler back end 1608 receives invocation signal 1618, and proceeds to compile the IL representation files together into a single machine code file, which is output by compiler back end 1608 as machine code 1620. Linker 1604 receives machine code 1620, and is configured to generate an executable file 1612, optionally using one or more LIB (library) files, DLL (dynamic-link library) files, etc.

With reference to flowchart 300 FIG. 3, IL representation 418 and machine code 1620 may be stored in storage 402 of FIG. 4 (step 304). Additionally, IPDB 422 may be generated by compiler front end 404 and/or compiler back end 1608 (e.g., by code analyzer 436 of FIG. 4) and stored in storage 402.

Subsequently, a developer may modify code in one or more of the source code files. The developer may invoke compiler 1602 for an incremental compile (e.g., using a command "-incremental" switch, or otherwise). The modified source code files (including the modified and non-modified source code files) may be received in FIG. 16 as modified source code 114. Compiler front end 1606 may generate revised IL representation 424, which includes an IL representation file for each source code file in modified source code 114. Compiler back end 1608 receives the IL representation files in revised IL representation 424, and passes them to linker 1604 in a similar fashion as described above in revised packaged IL representation files 1614. Linker 1604 receives revised packaged IL representation files 1614, and in response, determines that compiler back end 1608 is to be invoked to optimize the IL code across all of the IL representation files (rather than optimizing each IL file, linker 1604 generates invocation signal 1618 to cause compiler back end 1608 to perform incremental compilation of the revised IL representation files.

Accordingly, compiler back end 1608 receives invocation signal 1618, receives the revised IL representation files, and proceeds to perform incremental compilation according to flowchart 300 of FIG. 3. As described above, only the modified and affected functions of the single machine code file of machine code 1620 are compiled. Note that according to the techniques described above, modified functions and/or variables in one or more IL representation files may be determined. Furthermore, one or more functions that are affected by the modified functions and/or variables may be determined. The affected functions may be present in the same IL representation files as the modified functions and/or variables that affect them, or may be included in different files. For instance, a variable in a first file may affect a function in a second file, or a function in a third file may affect a function in a fourth file. Because dependence graph generator 702 is configured to generate dependence graph 704 based on all of the IL representation files, the affected functions may be found in any of the IL representation files.

The compiled functions are inserted into machine code 1620 (replacing the modified and affected compiled functions) to generate recompiled machine code 1622. Linker 1604 receives recompiled machine code 1622, and is configured to generate an executable file 1616 based thereon.

In this manner, embodiments of incremental compilation may be incorporated in LTCG compilation implementations.

D. Example Embodiments for Incremental Compilation with Inlining

A "callee" function is a function in source code that is called by another function of the source code, referred to as a "caller" function, to be performed. A callee function may be called any number of times by any number of caller functions. In this manner, the code of the callee function is reusable and can be present in the source code once, without having to be duplicated in each of the caller functions.

Note that the embodiments of compilers described herein may be configured to handle incremental compilation with regard to "inlining" of functions. "Inlining" is a compiler optimization where code of a callee function is substituted into the body a caller function during compilation of the source code (in place of the call). As such, inlining has benefits: the runtime overhead of a call instruction can be avoided, because the callee function code can be executed as though it were a part of the caller. Another benefit is that inlining enables more aggressive optimization because the optimizer (e.g., the compiler back end) has call-site specific information when optimizing the body of the inlined caller. So inlining can be an important optimization that affects program performance. Inlining uses heuristics to decide when to inline a callee. Too much inlining can cause a large increase in the size of a machine code binary, which can have negative impact.

In an embodiment, it may be desired for machine code generated from modified source code by an incremental build (e.g., recompiling a portion of the source code that was affected by modifications to the source code according to embodiments described herein) to be no different from the machine code generated from the modified source code by a full build (recompiling the modified source code entirely from scratch). Such a no-difference outcome can facilitate code testing, to ensure that users do not see a degradation in program performance for incrementally built machine code binaries.

An example of an undesired interaction between incremental compilation and inlining that may affect this no-difference preference is described in the following example scenario: in a full build, a function "foo" may call a function "bar." An inliner module of the compiler may decide not to inline function "bar" into function "foo" because function "bar" may be too large of a code portion (e.g., above a code size threshold limit for inlining). So assuming there are no other dependences indicated in the generated dependence graph (as described above), the dependence graph will not include a dependence edge from "bar" to "foo". Now if an edit to the function "bar" makes the function "bar" much smaller in size, and hence an inline candidate (e.g., having a size below the code size threshold limit for inlining), the machine code generated for the modified source code by an incremental compile would still be functionally correct if we did not re-compile function "foo". However, the machine code for the function "foo" generated by the incremental compile (without the inline) would be different from the machine code generated by a full compile where the code of function "bar" would be inlined into the code of function "foo."

As such, to solve this, in an embodiment, a function having any callees that were re-compiled may be partly recompiled. The partial compile of such functions may be performed after the inlining phase of compilation. An IL representation of source code generated after inlining may be received, and a second checksum may be generated for a function having any callees that were recompiled. The second checksum may be compared with the stored value of the post-inline checksum (generated from the IL representation prior to the modifications). If there is no difference in the checksums, the function may be treated as though it is unaffected. If there is a difference in the checksums, then we continue compiling the function. This enables the no-difference preference to be complied with at a small cost (that of partially compiling some functions).

III. Example Mobile and Stationary Device Embodiments

Computing device(s) 118, development system 100, source code editor 102, compiler 104, debugger tool 106, incremental compilation enabler 108, compiler 400, compiler front end 404, compiler back end 406, compilation module 408, incremental compilation enabler 410, marked/edited code determiner 412, affected function determiner 414, code assembler 416, code analyzer 436, changed function determiner 1302, changed variable determiner 1304, dependence graph generator 702, dependence graph analyzer 802, compiler 1602, linker 1604, compiler front end 1606, compiler back end 1608, flowchart 200, flowchart 300, step 502, flowchart 600, flowchart 900, flowchart 1100, flowchart 1200, flowchart 1400, and step 1502 may be implemented in hardware, or hardware combined with software and/or firmware. For example, development system 100, source code editor 102, compiler 104, debugger tool 106, incremental compilation enabler 108, compiler 400, compiler front end 404, compiler back end 406, compilation module 408, incremental compilation enabler 410, marked/edited code determiner 412, affected function determiner 414, code assembler 416, code analyzer 436, changed function determiner 1302, changed variable determiner 1304, dependence graph generator 702, dependence graph analyzer 802, compiler 1602, linker 1604, compiler front end 1606, compiler back end 1608, flowchart 200, flowchart 300, step 502, flowchart 600, flowchart 900, flowchart 1100, flowchart 1200, flowchart 1400, and/or step 1502 may be implemented as computer program code/instructions configured to be executed in one or more processors and stored in a computer readable storage medium. Alternatively, computing device(s) 118, development system 100, source code editor 102, compiler 104, debugger tool 106, incremental compilation enabler 108, compiler 400, compiler front end 404, compiler back end 406, compilation module 408, incremental compilation enabler 410, marked/edited code determiner 412, affected function determiner 414, code assembler 416, code analyzer 436, changed function determiner 1302, changed variable determiner 1304, dependence graph generator 702, dependence graph analyzer 802, compiler 1602, linker 1604, compiler front end 1606, compiler back end 1608, flowchart 200, flowchart 300, step 502, flowchart 600, flowchart 900, flowchart 1100, flowchart 1200, flowchart 1400, and/or step 1502 may be implemented as hardware logic/electrical circuitry.

For instance, in an embodiment, one or more, in any combination, of development system 100, source code editor 102, compiler 104, debugger tool 106, incremental compilation enabler 108, compiler 400, compiler front end 404, compiler back end 406, compilation module 408, incremental compilation enabler 410, marked/edited code determiner 412, affected function determiner 414, code assembler 416, code analyzer 436, changed function determiner 1302, changed variable determiner 1304, dependence graph generator 702, dependence graph analyzer 802, compiler 1602, linker 1604, compiler front end 1606, compiler back end 1608, flowchart 200, flowchart 300, step 502, flowchart 600, flowchart 900, flowchart 1100, flowchart 1200, flowchart 1400, and/or step 1502 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 17:
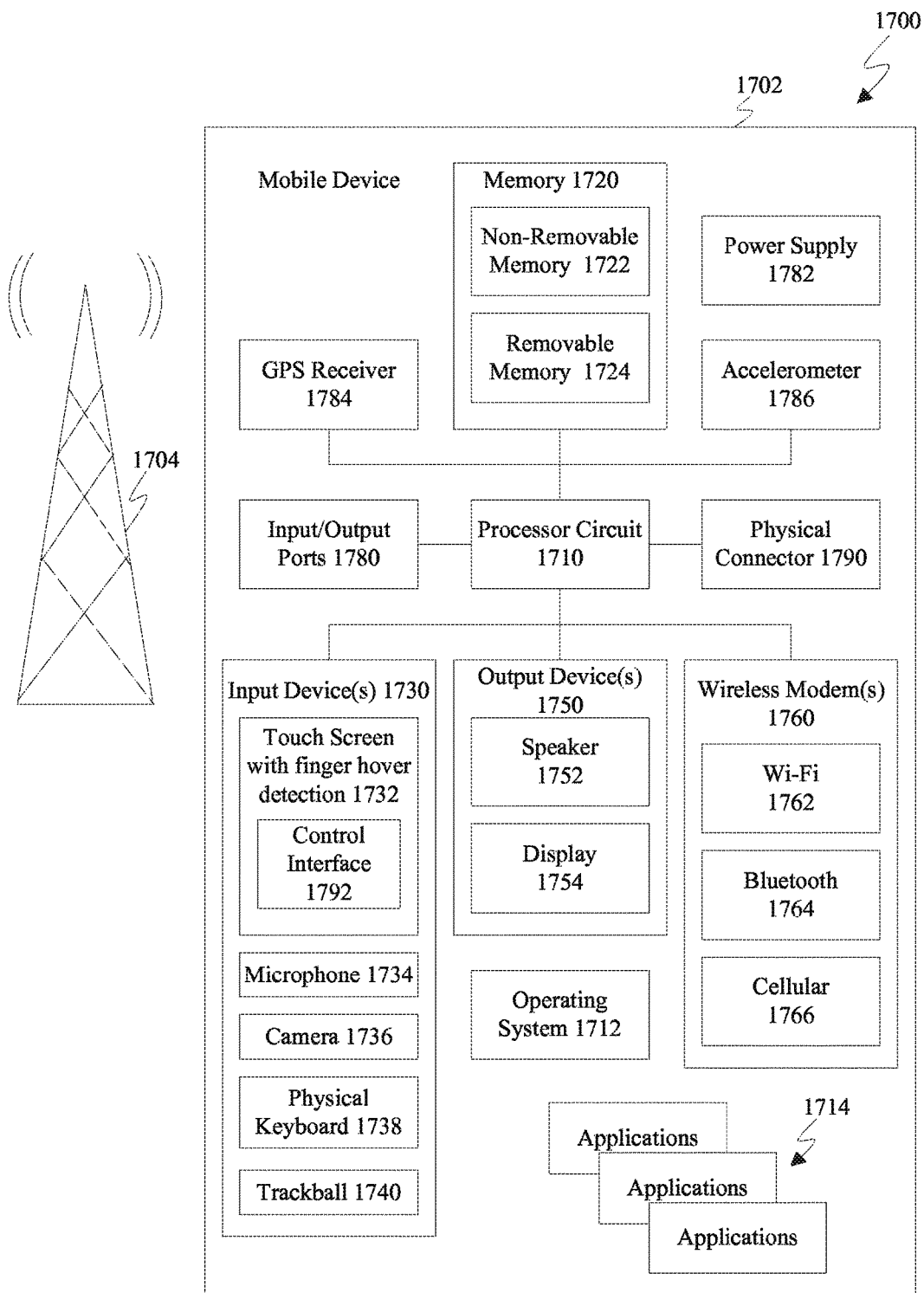
FIG. 17 shows a block diagram of an exemplary user device in which embodiments may be implemented.

FIG. 17 shows a block diagram of an exemplary mobile device 1700 including a variety of optional hardware and software components, shown generally as components 1702. For instance, components 1702 of mobile device 1700 are examples of components that may be included in computing device(s) 118 (FIG. 1) in mobile device embodiments. Any number and combination of the features/elements of components 1702 may be included in a mobile device embodiment, as well as additional and/or alternative features/elements, as would be known to persons skilled in the relevant art(s). It is noted that any of components 1702 can communicate with any other of components 1702, although not all connections are shown, for ease of illustration. Mobile device 1700 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1704, such as a cellular or satellite network, or with a local area or wide area network.

The illustrated mobile device 1700 can include a controller or processor referred to as processor circuit 1710 for performing such tasks as signal coding, image processing, data processing, input/output processing, power control, and/or other functions. Processor circuit 1710 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1710 may execute program code stored in a computer readable medium, such as program code of one or more applications 1714, operating system 1712, any program code stored in memory 1720, etc. Operating system 1712 can control the allocation and usage of the components 1702 and support for one or more application programs 1714 (a.k.a. applications, "apps", etc.). Application programs 1714 can include common mobile computing applications (e.g., email applications, calendars, contact managers, web browsers, messaging applications) and any other computing applications (e.g., word processing applications, mapping applications, media player applications).

As illustrated, mobile device 1700 can include memory 1720. Memory 1720 can include non-removable memory 1722 and/or removable memory 1724. The non-removable memory 1722 can include RAM, ROM, flash memory, a hard disk, or other well-known memory storage technologies. The removable memory 1724 can include flash memory or a Subscriber Identity Module (SIM) card, which is well known in GSM communication systems, or other well-known memory storage technologies, such as "smart cards." The memory 1720 can be used for storing data and/or code for running the operating system 1712 and the applications 1714. Example data can include web pages, text, images, sound files, video data, or other data sets to be sent to and/or received from one or more network servers or other devices via one or more wired or wireless networks. Memory 1720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1720. These programs include operating system 1712, one or more application programs 1714, and other program modules and program data. Examples of such application programs or program modules may include, for example, computer program logic (e.g., computer program code or instructions) for implementing development system 100, source code editor 102, compiler 104, debugger tool 106, incremental compilation enabler 108, compiler 400, compiler front end 404, compiler back end 406, compilation module 408, incremental compilation enabler 410, marked/edited code determiner 412, affected function determiner 414, code assembler 416, code analyzer 436, changed function determiner 1302, changed variable determiner 1304, dependence graph generator 702, dependence graph analyzer 802, compiler 1602, linker 1604, compiler front end 1606, compiler back end 1608, flowchart 200, flowchart 300, step 502, flowchart 600, flowchart 900, flowchart 1100, flowchart 1200, flowchart 1400, and/or step 1502 (including any suitable step of flowcharts 200, 300, 600, 900, 1100, 1200, and 1400), and/or further embodiments described herein.

Mobile device 1700 can support one or more input devices 1730, such as a touch screen 1732, microphone 1734, camera 1736, physical keyboard 1738 and/or trackball 1740 and one or more output devices 1750, such as a speaker 1752 and a display 1754. Touch screens, such as touch screen 1732, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1732 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The touch screen 1732 is shown to include a control interface 1792 for illustrative purposes. The control interface 1792 is configured to control content associated with a virtual element that is displayed on the touch screen 1732. In an example embodiment, the control interface 1792 is configured to control content that is provided by one or more of applications 1714. For instance, when a user of the mobile device 1700 utilizes an application, the control interface 1792 may be presented to the user on touch screen 1732 to enable the user to access controls that control such content. Presentation of the control interface 1792 may be based on (e.g., triggered by) detection of a motion within a designated distance from the touch screen 1732 or absence of such motion. Example embodiments for causing a control interface (e.g., control interface 1792) to be presented on a touch screen (e.g., touch screen 1732) based on a motion or absence thereof are described in greater detail below.

Other possible output devices (not shown) can include piezoelectric or other haptic output devices. Some devices can serve more than one input/output function. For example, touch screen 1732 and display 1754 can be combined in a single input/output device. The input devices 1730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1712 or applications 1714 can comprise speech-recognition software as part of a voice control interface that allows a user to operate the device 1700 via voice commands. Further, device 1700 can comprise input devices and software that allows for user interaction via a user's spatial gestures, such as detecting and interpreting gestures to provide input to a gaming application.

Wireless modem(s) 1760 can be coupled to antenna(s) (not shown) and can support two-way communications between processor circuit 1710 and external devices, as is well understood in the art. The modem(s) 1760 are shown generically and can include a cellular modem 1766 for communicating with the mobile communication network 1704 and/or other radio-based modems (e.g., Bluetooth 1764 and/or Wi-Fi 1762). Cellular modem 1766 may be configured to enable phone calls (and optionally transmit data) according to any suitable communication standard or technology, such as GSM, 3G, 4G, 5G, etc. At least one of the wireless modem(s) 1760 is typically configured for communication with one or more cellular networks, such as a GSM network for data and voice communications within a single cellular network, between cellular networks, or between the mobile device and a public switched telephone network (PSTN).

Mobile device 1700 can further include at least one input/output port 1780, a power supply 1782, a satellite navigation system receiver 1784, such as a Global Positioning System (GPS) receiver, an accelerometer 1786, and/or a physical connector 1790, which can be a USB port, IEEE 1394 (FireWire) port, and/or RS-232 port. The illustrated components 1702 are not required or all-inclusive, as any components can be not present and other components can be additionally present as would be recognized by one skilled in the art.

Figure 18:
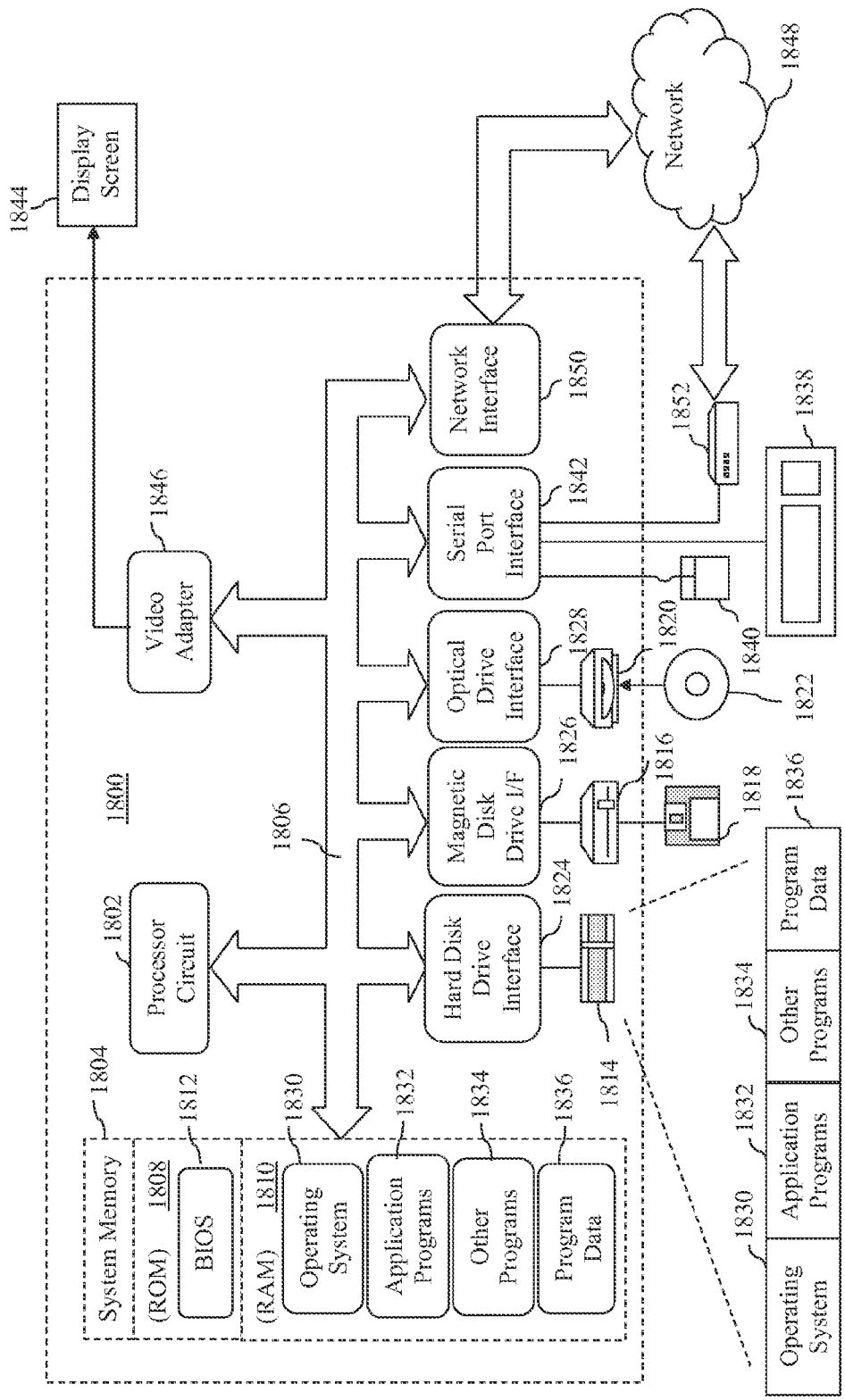
FIG. 18 shows a block diagram of an example computing device that may be used to implement embodiments.

Furthermore, FIG. 18 depicts an exemplary implementation of a computing device 1800 in which embodiments may be implemented. For example, computing device(s) 118 (FIG. 1) may be implemented in one or more computing devices similar to computing device 1800 in stationary computer embodiments, including one or more features of computing device 1800 and/or alternative features. The description of computing device 1800 provided herein is provided for purposes of illustration, and is not intended to be limiting. Embodiments may be implemented in further types of computer systems, as would be known to persons skilled in the relevant art(s).

As shown in FIG. 18, computing device 1800 includes one or more processors, referred to as processor circuit 1802, a system memory 1804, and a bus 1806 that couples various system components including system memory 1804 to processor circuit 1802. Processor circuit 1802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1802 may execute program code stored in a computer readable medium, such as program code of operating system 1830, application programs 1832, other programs 1834, etc. Bus 1806 represents one or more of any of several types of bus structures, including a memory bus or memory controller, a peripheral bus, an accelerated graphics port, and a processor or local bus using any of a variety of bus architectures. System memory 1804 includes read only memory (ROM) 1808 and random access memory (RAM) 1810. A basic input/output system 1812 (BIOS) is stored in ROM 1808.

Computing device 1800 also has one or more of the following drives: a hard disk drive 1814 for reading from and writing to a hard disk, a magnetic disk drive 1816 for reading from or writing to a removable magnetic disk 1818, and an optical disk drive 1820 for reading from or writing to a removable optical disk 1822 such as a CD ROM, DVD ROM, or other optical media. Hard disk drive 1814, magnetic disk drive 1816, and optical disk drive 1820 are connected to bus 1806 by a hard disk drive interface 1824, a magnetic disk drive interface 1826, and an optical drive interface 1828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1830, one or more application programs 1832, other programs 1834, and program data 1836. Application programs 1832 or other programs 1834 may include, for example, computer program logic (e.g., computer program code or instructions) for implementing development system 100, source code editor 102, compiler 104, debugger tool 106, incremental compilation enabler 108, compiler 400, compiler front end 404, compiler back end 406, compilation module 408, incremental compilation enabler 410, marked/edited code determiner 412, affected function determiner 414, code assembler 416, code analyzer 436, changed function determiner 1302, changed variable determiner 1304, dependence graph generator 702, dependence graph analyzer 802, compiler 1602, linker 1604, compiler front end 1606, compiler back end 1608, flowchart 200, flowchart 300, step 502, flowchart 600, flowchart 900, flowchart 1100, flowchart 1200, flowchart 1400, and/or step 1502 (including any suitable step of flowcharts 200, 300, 600, 900, 1100, 1200, and 1400), and/or further embodiments described herein.

A user may enter commands and information into the computing device 1800 through input devices such as keyboard 1838 and pointing device 1840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1802 through a serial port interface 1842 that is coupled to bus 1806, but may be connected by other interfaces, such as a parallel port, game port, or a universal serial bus (USB).

A display screen 1844 is also connected to bus 1806 via an interface, such as a video adapter 1846. Display screen 1844 may be external to, or incorporated in computing device 1800. Display screen 1844 may display information, as well as being a user interface for receiving user commands and/or other information (e.g., by touch, finger gestures, virtual keyboard, etc.). In addition to display screen 1844, computing device 1800 may include other peripheral output devices (not shown) such as speakers and printers.

Computing device 1800 is connected to a network 1848 (e.g., the Internet) through an adaptor or network interface 1850, a modem 1852, or other means for establishing communications over the network. Modem 1852, which may be internal or external, may be connected to bus 1806 via serial port interface 1842, as shown in FIG. 18, or may be connected to bus 1806 using another interface type, including a parallel interface.

As used herein, the terms "computer program medium," "computer-readable medium," and "computer-readable storage medium" are used to generally refer to physical hardware media such as the hard disk associated with hard disk drive 1814, removable magnetic disk 1818, removable optical disk 1822, other physical hardware media such as RAMs, ROMs, flash memory cards, digital video disks, zip disks, MEMs, nanotechnology-based storage devices, and further types of physical/tangible hardware storage media (including memory 1720 of FIG. 17). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1832 and other programs 1834) may be stored on the hard disk, magnetic disk, optical disk, ROM, RAM, or other hardware storage medium. Such computer programs may also be received via network interface 1850, serial port interface 1842, or any other interface type. Such computer programs, when executed or loaded by an application, enable computing device 1800 to implement features of embodiments discussed herein. Accordingly, such computer programs represent controllers of the computing device 1800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In one embodiment, a method comprises: providing an interface configured to enable a user to mark a portion of a source code for which to disable optimized compilation to generate a marked version of the source code, the interface configured to enable the user to disable optimized compilation on a function-by-function basis in the source code; and building a partially optimized compiled representation of the source code with optimizations disabled at least for the marked portion and optimizations enabled for other portions of the source code.

In an embodiment, the building comprises: building a fully optimized compiled representation of the source code with optimizations enabled for an entirety of the source code; determining, based at least on the marked portion, one or more functions of the source code to be recompiled with optimizations disabled; recompiling the determined one or more functions with optimizations disabled; and patching the recompiled one or more functions into the fully optimized compiled representation of the source code to generate the partially optimized compiled representation.

In an embodiment, the building a fully optimized compiled representation of the source code with optimizations enabled for an entirety of the source code comprises: generating an incremental program database that at least indicates dependencies between functions of the fully optimized compiled representation of the source code.

In an embodiment, the determining, based at least on the marked portion, one or more functions of the source code to be recompiled with optimizations disabled comprises: generating a dependence graph for the source code based on the incremental program database; traversing the dependence graph from any functions and any variables included in the marked portion to determine a set of affected functions; and including any functions in the marked portion and any functions in the determined set of affected functions in a set of functions to be recompiled with optimizations disabled.

In an embodiment, the generating a dependence graph for the source code based on the incremental program database comprises: associating a node with each variable and with each function of the source code to designate a plurality of nodes; determining a first set of directed edges, each directed edge of the first set extends from a first function node to a second function node of the dependence graph to indicate that a change in the function associated with the first function node affects the function associated with the second function node; determining a second set of directed edges, each directed edge of the second set extends from a variable node to a third function node of the dependence graph to indicate that a change in the variable associated with the variable node affects the function associated with the third function node; and storing a dependence graph that includes the plurality of nodes, the first set of directed edges, and the second set of directed edges.

In an embodiment, the traversing the dependence graph with regard to any functions and any variables in the marked portion to determine the one or more functions comprises: traversing directed edges of the first set of directed edges from a node for each function in the marked portion to determine first affected functions; and traversing directed edges of the second set of directed edges from a node for each variable in the marked portion to determine second affected functions. The determined one or more functions includes the first affected functions, the second affected functions, and any functions in the marked portion.

In an embodiment, the method further comprises: executing a debugger session on the partially optimized compiled representation; receiving at least one edit to a function in the marked portion during the debugger session; determining a set of functions of the marked version of the source code to be recompiled with optimizations disabled due to the received at least one edit; recompiling the determined set of functions with optimizations disabled; patching the recompiled set of functions into the partially optimized compiled representation of the marked version of the source code to generate a revised version of the partially optimized compiled representation; and executing the debugger session on the revised version of the partially optimized compiled representation.

In an embodiment, the method further comprises: generating an incremental program database that at least indicates dependencies between functions of the partially optimized compiled representation of the marked version of the source code. The determining a set of functions of the source code to be recompiled with optimizations disabled due to the received at least one edit comprises: determining a first set of checksums from the incremental program database that includes a checksum calculated for each function in an intermediate language version of the partially optimized compiled representation; determining a second set of checksums that includes a checksum calculated for each function in an intermediate language version of the edited source code; and comparing the first set of checksums to the second set of checksums to determine at least one function that changed in the edited source code.

In another embodiment, a system comprises a code editor and a compiler. The code editor is configured to provide an interface configured to enable a user to mark a portion of a source code for which to disable optimized compilation to generate a marked version of the source code, the interface configured to enable the user to disable optimized compilation on a function-by-function basis in the source code.

The compiler is configured to build a partially optimized compiled representation of the source code with optimizations disabled at least for the marked portion and optimizations enabled for other portions of the source code.

In an embodiment, the compiler is configured to: build a fully optimized compiled representation of the source code with optimizations enabled for an entirety of the source code; determine, based at least on the marked portion, one or more functions of the source code to be recompiled with optimizations disabled; recompile the determined one or more functions with optimizations disabled; and patch the recompiled one or more functions into the fully optimized compiled representation of the source code to generate the partially optimized compiled representation.

In an embodiment, the compiler comprises a code analyzer configured to generate an incremental program database that at least indicates dependencies between functions of the fully optimized compiled representation of the source code.

In an embodiment, the code analyzer comprises: a dependence graph generator configured to generate a dependence graph for the source code based on the incremental program database. In an embodiment, the compiler further comprises: an affected function determiner configured to traverse the dependence graph from any functions and any variables included in the marked portion to determine a set of affected functions. Any functions in the marked portion and any functions in the determined set of affected functions are included in a set of functions to be recompiled with optimizations disabled.

In an embodiment, the dependence graph generator is configured to: associate a node with each variable and with each function of the source code to designate a plurality of nodes; determine a first set of directed edges, each directed edge of the first set extends from a first function node to a second function node of the dependence graph to indicate that a change in the function associated with the first function node affects the function associated with the second function node; determine a second set of directed edges, each directed edge of the second set extends from a variable node to a third function node of the dependence graph to indicate that a change in the variable associated with the variable node affects the function associated with the third function node; and store a dependence graph that includes the plurality of nodes, the first set of directed edges, and the second set of directed edges.

In an embodiment, the affected function determiner is configured to: traverse directed edges of the first set of directed edges from a node for each function in the marked portion to determine first affected functions; and traverse directed edges of the second set of directed edges from a node for each variable in the marked portion to determine second affected functions. The determined one or more functions include the first affected functions, the second affected functions, and any functions in the marked portion.

In an embodiment, the system further comprises a debugger tool configured to execute a debugger session on the partially optimized compiled representation. The code editor is configured to receive at least one edit to a function in the marked portion during the debugger session. The compiler is configured to determine a set of functions of the marked version of the source code to be recompiled with optimizations disabled due to the received at least one edit, recompile the determined set of functions with optimizations disabled, and patch the recompiled set of functions into the partially optimized compiled representation of the marked version of the source code to generate a revised version of the partially optimized compiled representation. The debugger tool is configured to execute the debugger session on the revised version of the partially optimized compiled representation.

In an embodiment, the compiler comprises a code analyzer is configured to generate an incremental program database that at least indicates dependencies between functions of the partially optimized compiled representation of the marked version of the source code. The compiler is configured to receive a first set of checksums from the incremental program database that includes a checksum calculated for each function in an intermediate language version of the partially optimized compiled representation; determine a second set of checksums that includes a checksum calculated for each function in an intermediate language version of the edited source code; and compare the first set of checksums to the second set of checksums to determine at least one function that changed in the edited source code.

In another embodiment, a computer-readable storage medium comprises computer-executable instructions that, when executed by a processor, perform a method comprising: providing an interface configured to enable a user to mark a portion of a source code for which to disable optimized compilation to generate a marked version of the source code, the interface configured to enable the user to disable optimized compilation on a function-by-function basis in the source code; and building a partially optimized compiled representation of the source code with optimizations disabled at least for the marked portion and optimizations enabled for other portions of the source code.

In an embodiment, the building comprises: building a fully optimized compiled representation of the source code with optimizations enabled for an entirety of the source code; determining, based at least on the marked portion, one or more functions of the source code to be recompiled with optimizations disabled; recompiling the determined one or more functions with optimizations disabled; and patching the recompiled one or more functions into the fully optimized compiled representation of the source code to generate the partially optimized compiled representation.

In an embodiment, the building a fully optimized compiled representation of the source code with optimizations enabled for an entirety of the source code comprises generating an incremental program database that at least indicates dependencies between functions of the fully optimized compiled representation of the source code. In an embodiment, the determining, based at least on the marked portion, one or more functions of the source code to be recompiled with optimizations disabled comprises: generating a dependence graph for the source code based on the incremental program database; traversing the dependence graph from any functions and any variables included in the marked portion to determine a set of affected functions; and including any functions in the marked portion and any functions in the determined set of affected functions in a set of functions to be recompiled with optimizations disabled.

In an embodiment, the method further comprises: executing a debugger session on the partially optimized compiled representation; receiving at least one edit to a function in the marked portion during the debugger session; determining a set of functions of the marked version of the source code to be recompiled with optimizations disabled due to the received at least one edit; recompiling the determined set of functions with optimizations disabled; patching the recompiled set of functions into the partially optimized compiled representation of the marked version of the source code to generate a revised version of the partially optimized compiled representation; and executing the debugger session on the revised version of the partially optimized compiled representation.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
providing an interface configured to enable a user to mark a portion of a source code for which to disable optimized compilation to generate a marked version of the source code, the interface configured to enable the user to disable optimized compilation on a function-by-function basis in the source code; and
building a partially optimized compiled representation of the marked version of the source code with optimizations disabled at least for the marked portion and optimizations enabled for other portions of the marked source code, said building comprising:
building a fully optimized compiled representation of the source code with optimizations enabled for an entirety of the source code;
determining, based at least on the marked portion, one or more functions of the source code to be recompiled with optimizations disabled, the one or more functions of the source code being determined based on traversing a dependence graph from any functions and any variables included in the marked portion to determine a set of affected functions, the dependence graph indicating that a change in a first function of the source code affects a second function of the source code and further indicates that a change in a first variable affects a third function, the dependence graph comprising a plurality of nodes and a plurality of directed edges coupling the plurality of nodes, each of the nodes being associated with a particular variable or a particular function of the source code, said traversing comprising:
traversing a first set of directed edges of the plurality of directed edges from a node for each function in the marked portion to determine first affected functions; and
traversing a second set of directed edges of the dependence graph from a node for each variable in the marked portion to determine second affected functions, the determined one or more functions including the first affected functions, the second affected functions, and any functions in the marked portion.

2. The method of claim 1, wherein said building a fully optimized compiled representation of the source code with optimizations enabled for an entirety of the source code comprises:
generating an incremental program database that at least indicates dependencies between functions of the fully optimized compiled representation of the source code.

3. The method of claim 2, wherein said determining, based at least on the marked portion, one or more functions of the source code to be recompiled with optimizations disabled comprises:
generating the dependence graph for the source code based on the incremental program database; and
including any functions in the marked portion and any functions in the determined set of affected functions in a set of functions to be recompiled with optimizations disabled.

4. The method of claim 3, wherein said generating the dependence graph for the source code based on the incremental program database comprises:
determining the first set of directed edges, each directed edge of the first set extends from a first function node of the dependence graph and being associated with the first function to a second function node of the dependence graph and being associated with the second function to indicate that the change in the first function associated with the first function node affects the second function associated with the second function node;
determining the second set of directed edges, each directed edge of the second set extends from a variable node of the dependence graph and being associated with the first variable to a third function node of the dependence graph and being associated with the third function to indicate that the change in the first variable associated with the variable node affects the third function associated with the third function node; and
storing the dependence graph that includes the plurality of nodes, the first set of directed edges, and the second set of directed edges.

5. The method of claim 1, further comprising:
executing a debugger session on the partially optimized compiled representation;
receiving at least one edit to a function in the marked portion during the debugger session;
determining a set of functions of the marked version of the source code to be recompiled with optimizations disabled due to the received at least one edit;
recompiling the determined set of functions with optimizations disabled;
patching the recompiled set of functions into the partially optimized compiled representation of the marked version of the source code to generate a revised version of the partially optimized compiled representation; and
executing the debugger session on the revised version of the partially optimized compiled representation.

6. The method of claim 5, further comprising:
generating an incremental program database that at least indicates dependencies between functions of the partially optimized compiled representation of the marked version of the source code; and
wherein said determining a set of functions of the source code to be recompiled with optimizations disabled due to the received at least one edit comprises:
determining a first set of checksums from the incremental program database that includes a checksum calculated for each function in an intermediate language version of the marked version of the source code;
determining a second set of checksums that includes a checksum calculated for each function in an intermediate language version of the edited source code; and comparing the first set of checksums to the second set of checksums to determine at least one function that changed in the edited source code.

7. The method of claim 1, further comprising:
recompiling the determined one or more functions with optimizations disabled; and
patching the recompiled one or more functions into the fully optimized compiled representation of the source code to generate the partially optimized compiled representation.

8. A system, comprising:
at least one processor circuit; and
at least one memory that stores program code configured to be executed by the at least one processor circuit, the program code comprising:
a code editor configured to provide an interface configured to enable a user to mark a portion of a source code for which to disable optimized compilation to generate a marked version of the source code, the interface configured to enable the user to disable optimized compilation on a function-by-function basis in the source code; and
a compiler configured to build a partially optimized compiled representation of the marked version of the source code with optimizations disabled at least for the marked portion and optimizations enabled for other portions of the marked source code, the compiler configured to:
build a fully optimized compiled representation of the source code with optimizations enabled for an entirety of the source code;
determine, based at least on the marked portion, one or more functions of the source code to be recompiled with optimizations disabled, the one or more functions of the source code being determined based on a traversal of a dependence graph from any functions and any variables included in the marked portion to determine a set of affected functions, the dependence graph indicating that a change in a first function of the source code affects a second function of the source code and further indicates that a change in a first variable affects a third function, the dependence graph comprising a plurality of nodes and a plurality of directed edges coupling the plurality of nodes, each of the nodes being associated with a particular variable or a particular function of the source code, the traversal including:
a traverse of a first set of directed edges of the plurality of directed edges from a node for each function in the marked portion to determine first affected functions; and
a traverse of a second set of directed edges of the dependence graph from a node for each variable in the marked portion to determine second affected functions, the determined one or more functions including the first affected functions, the second affected functions, and any functions in the marked portion.

9. The system of claim 8, wherein the compiler comprises:
a code analyzer configured to generate an incremental program database that at least indicates dependencies between functions of the fully optimized compiled representation of the source code.

10. The system of claim 9, wherein the code analyzer comprises:
a dependence graph generator configured to generate the dependence graph for the source code based on the incremental program database,
any functions in the marked portion and any functions in the determined set of affected functions are included in a set of functions to be recompiled with optimizations disabled.

11. The system of claim 10, wherein the dependence graph generator is configured to:
determine the first set of directed edges, each directed edge of the first set extends from a first function node of the dependence graph and being associated with the first function to a second function node of the dependence graph and being associated with the second function to indicate that the change in the first function associated with the first function node affects the second function associated with the second function node;
determine the second set of directed edges, each directed edge of the second set extends from a variable node of the dependent graph and being associated with the first variable to a third function node of the dependence graph and being associated with the third function to indicate that the change in the first variable associated with the variable node affects the third function associated with the third function node; and
store the dependence graph that includes the plurality of nodes, the first set of directed edges, and the second set of directed edges.

12. The system of claim 8, further comprising:
a debugger tool configured to execute a debugger session on the partially optimized compiled representation; and
the code editor configured to receive at least one edit to a function in the marked portion during the debugger session;
the compiler configured to
determine a set of functions of the marked version of the source code to be recompiled with optimizations disabled due to the received at least one edit,
recompile the determined set of functions with optimizations disabled, and
patch the recompiled set of functions into the partially optimized compiled representation of the marked version of the source code to generate a revised version of the partially optimized compiled representation; and
the debugger tool configured to execute the debugger session on the revised version of the partially optimized compiled representation.

13. The system of claim 12, wherein the compiler comprises:
a code analyzer is configured to generate an incremental program database that at least indicates dependencies between functions of the partially optimized compiled representation of the marked version of the source code; and
the compiler is configured to
receive a first set of checksums from the incremental program database that includes a checksum calculated for each function in an intermediate language version of the marked version of the source code;
determine a second set of checksums that includes a checksum calculated for each function in an intermediate language version of the edited source code; and
compare the first set of checksums to the second set of checksums to determine at least one function that changed in the edited source code.

14. The system of claim 8, wherein the compiler is further configured to:
- recompile the determined one or more functions with optimizations disabled; and
- patch the recompiled one or more functions into the fully optimized compiled representation of the source code to generate the partially optimized compiled representation.

15. A computer-readable storage medium comprising computer-executable instructions that, when executed by a processor, perform a method comprising:
- building a fully optimized compiled representation of a source code with optimizations enabled for an entirety of the source code;
- generating an incremental program database that at least indicates dependencies between functions of the fully optimized compiled representation of the source code;
- providing an interface configured to enable a user to mark a portion of the source code for which to disable optimized compilation to generate a marked version of the source code, the interface configured to enable the user to disable optimized compilation on a function-by-function basis in the source code; and
- building a partially optimized compiled representation of the marked version of the source code with optimizations disabled at least for the marked portion and optimizations enabled for other portions of the marked source code, including
  - determining, based at least on the marked portion, one or more functions of the source code to be recompiled with optimizations disabled, the one or more functions of the source code being determined based on traversing a dependence graph from any functions and any variables included in the marked portion to determine a set of affected functions, the dependence graph indicating that a change in a first function of the source code affects a second function of the source code and further indicates that a change in a first variable affects a third function, the dependence graph comprising a plurality of nodes and a plurality of directed edges coupling the plurality of nodes, each of the nodes being associated with a particular variable or a particular function of the source code, said traversing comprising:
    - traversing a first set of directed edges of the plurality of directed edges from a node for each function in the marked portion to determine first affected functions; and
    - traversing a second set of directed edges of the dependence graph from a node for each variable in the marked portion to determine second affected functions, the determined one or more functions including the first affected functions, the second affected functions, and any functions in the marked portion.

16. The computer-readable storage medium of claim 15, wherein said determining, based at least on the marked portion, one or more functions of the source code to be recompiled with optimizations disabled comprises:
- generating the dependence graph for the source code based on the incremental program database; and
- including any functions in the marked portion and any functions in the determined set of affected functions in a set of functions to be recompiled with optimizations disabled.

17. The computer-readable storage medium of claim 16, wherein said generating the dependence graph for the source code based on the incremental program database comprises:
- determining the first set of directed edges, each directed edge of the first set extends from a first function node of the dependence graph and being associated with the first function to a second function node of the dependence graph and being associated with the second function to indicate that the change in the first function associated with the first function node affects the second function associated with the second function node;
- determining the second set of directed edges, each directed edge of the second set extends from a variable node of the dependence graph and being associated with the first variable to a third function node of the dependence graph and being associated with the third function to indicate that the change in the first variable associated with the variable node affects the third function associated with the third function node; and
- storing the dependence graph that includes the plurality of nodes, the first set of directed edges, and the second set of directed edges.

18. The computer-readable storage medium of claim 15, wherein the method further comprises:
- executing a debugger session on the partially optimized compiled representation;
- receiving at least one edit to a function in the marked portion during the debugger session;
- determining a set of functions of the marked version of the source code to be recompiled with optimizations disabled due to the received at least one edit;
- recompiling the determined set of functions with optimizations disabled;
- patching the recompiled set of functions into the partially optimized compiled representation of the marked version of the source code to generate a revised version of the partially optimized compiled representation; and
- executing the debugger session on the revised version of the partially optimized compiled representation.

19. The computer-readable storage medium of claim 18, wherein the method further comprises:
- generating the incremental program database to at least indicate dependencies between functions of the partially optimized compiled representation of the marked version of the source code; and
- wherein said determining a set of functions of the source code to be recompiled with optimizations disabled due to the received at least one edit comprises:
  - determining a first set of checksums from the incremental program database that includes a checksum calculated for each function in an intermediate language version of the marked version of the source code;
  - determining a second set of checksums that includes a checksum calculated for each function in an intermediate language version of the edited source code; and
  - comparing the first set of checksums to the second set of checksums to determine at least one function that changed in the edited source code.

20. The computer-readable storage medium of claim 15, said building further comprising:
- recompiling the determined one or more functions with optimizations disabled; and patching the recompiled one or more functions into the fully optimized compiled representation of the source code to generate the partially optimized compiled representation.

* * * * *